United States Patent
Yajima et al.

(10) Patent No.: US 11,510,397 B2
(45) Date of Patent: *Nov. 29, 2022

(54) MANAGEMENT APPARATUS, INDIVIDUAL MANAGEMENT SYSTEM, AND INDIVIDUAL SEARCH SYSTEM

(71) Applicant: Sony Corporation, Tokyo (JP)

(72) Inventors: Masakazu Yajima, Kanagawa (JP); Hideo Niikura, Tokyo (JP)

(73) Assignee: Sony Corporation, Tokyo (JP)

( * ) Notice: Subject to any disclaimer, the term of this patent is extended or adjusted under 35 U.S.C. 154(b) by 232 days.

This patent is subject to a terminal disclaimer.

(21) Appl. No.: 16/893,227

(22) Filed: Jun. 4, 2020

(65) Prior Publication Data
US 2020/0296936 A1    Sep. 24, 2020

Related U.S. Application Data

(63) Continuation of application No. 16/735,460, filed on Jan. 6, 2020, now Pat. No. 10,729,107, which is a
(Continued)

(30) Foreign Application Priority Data

May 12, 2015    (JP) .............................. JP2015-097747

(51) Int. Cl.
*A01K 29/00*    (2006.01)
*A01K 11/00*    (2006.01)
(Continued)

(52) U.S. Cl.
CPC .......... *A01K 29/005* (2013.01); *A01K 11/004* (2013.01); *A01K 11/006* (2013.01);
(Continued)

(58) Field of Classification Search
CPC .. A01K 11/008; A01K 11/004; A01K 29/005; G06Q 50/02; G06K 17/0029
See application file for complete search history.

(56) References Cited

U.S. PATENT DOCUMENTS 6,032,084 A * 2/2000 Anderson ............ H04N 13/194
348/E13.019
6,579,231 B1   6/2003 Phipps
(Continued)

FOREIGN PATENT DOCUMENTS

JP    2004-222519 A    8/2004
JP    2005-520524 A    7/2005
(Continued)

OTHER PUBLICATIONS

U.S. Appl. No. 15/571,344, filed Nov. 2, 2017, Yajima et al.
(Continued)

*Primary Examiner* — Thomas D Alunkal
(74) *Attorney, Agent, or Firm* — Wolf, Greenfield & Sacks, P.C.

(57) ABSTRACT

To provide a management apparatus capable of capturing a position of a specific individual satisfying a predetermined condition. A management apparatus according to an embodiment of the present technology includes a control unit. The control unit extracts, on the basis of first information that is generated by a sensor device worn by an individual and is related to a living body of the individual, a specific individual satisfying a predetermined condition, and generates, on the basis of position information related to a position of the specific individual, search information for causing a mobile object to move to the position of the specific individual.

25 Claims, 24 Drawing Sheets

Related U.S. Application Data continuation of application No. 16/236,067, filed on Dec. 28, 2018, now Pat. No. 10,609,907, which is a continuation of application No. 15/571,344, filed as application No. PCT/JP2016/001925 on Apr. 6, 2016, now Pat. No. 10,212,922.

(51) Int. Cl.

| | | |
|---|---|---|
| *G01S 1/68* | (2006.01) | |
| *G01S 5/02* | (2010.01) | |
| *G06Q 10/08* | (2012.01) | |
| *G06K 17/00* | (2006.01) | |
| *G06Q 50/02* | (2012.01) | |
| *H04Q 9/00* | (2006.01) | |
| *G01S 5/14* | (2006.01) | |
| *G06Q 10/06* | (2012.01) | |

(52) U.S. Cl.
CPC .............. *A01K 11/008* (2013.01); *G01S 1/68* (2013.01); *G01S 5/02* (2013.01); *G01S 5/14* (2013.01); *G06K 17/0029* (2013.01); *G06Q 10/063* (2013.01); *G06Q 10/087* (2013.01); *G06Q 50/02* (2013.01); *H04Q 9/00* (2013.01); *H04Q 2209/40* (2013.01)

(56) References Cited

U.S. PATENT DOCUMENTS

| | | | | |
|---|---|---|---|---|
| 10,212,922 | B2* | 2/2019 | Yajima | A01K 11/004 |
| 10,375,928 | B2 | 8/2019 | Yajima et al. | |
| 10,515,241 | B2 | 12/2019 | Niikura et al. | |
| 10,609,907 | B2* | 4/2020 | Yajima | H04Q 9/00 |
| 10,729,107 | B2* | 8/2020 | Yajima | A01K 11/006 |
| 2002/0030600 | A1* | 3/2002 | Starner | G08B 21/02 |
| | | | | 340/628 |
| 2005/0265272 | A1 | 12/2005 | Thorstensen et al. | |
| 2006/0282021 | A1* | 12/2006 | DeVaul | A61B 5/0205 |
| | | | | 600/595 |
| 2008/0201076 | A1* | 8/2008 | Huang | G01C 21/00 |
| | | | | 701/469 |
| 2009/0322513 | A1* | 12/2009 | Hwang | H04W 4/90 |
| | | | | 600/301 |
| 2013/0340305 | A1* | 12/2013 | Mobley | A01K 11/008 |
| | | | | 40/300 |
| 2016/0100802 | A1* | 4/2016 | Newman | A61B 5/0022 |
| | | | | 600/595 |
| 2016/0227742 | A1* | 8/2016 | Rovnyi | A61B 5/11 |
| 2017/0251633 | A1* | 9/2017 | Womble | A01K 5/02 |
| 2018/0000575 | A1* | 1/2018 | Fobi | B64C 39/024 |
| 2018/0146645 | A1 | 5/2018 | Arbel | |
| 2018/0242515 | A1 | 8/2018 | Yajima et al. | |
| 2018/0279583 | A1 | 10/2018 | Yajima et al. | |
| 2018/0295809 | A1 | 10/2018 | Yajima et al. | |
| 2019/0116764 | A1 | 4/2019 | Komatsu et al. | |
| 2019/0133087 | A1 | 5/2019 | Yajima et al. | |
| 2019/0163941 | A1 | 5/2019 | Niikura et al. | |
| 2019/0183436 | A1 | 6/2019 | Yajima et al. | |
| 2019/0380306 | A1 | 12/2019 | Niikura et al. | |
| 2020/0137985 | A1 | 5/2020 | Yajima et al. | |

FOREIGN PATENT DOCUMENTS

| | | |
|---|---|---|
| JP | 2008-282073 A | 11/2008 |
| JP | 2011-244736 A | 12/2011 |
| WO | WO 03/079773 A1 | 10/2003 |

OTHER PUBLICATIONS

U.S. Appl. No. 15/753,043, filed Feb. 15, 2018, Yajima et al.
U.S. Appl. No. 15/759,016, filed Mar. 9, 2018, Yajima et al.
U.S. Appl. No. 16/093,173, filed Oct. 12, 2018, Komatsu et al.
U.S. Appl. No. 16/093,222, filed Oct. 12, 2018, Niikura et al.
U.S. Appl. No. 16/093,281, filed Oct. 12, 2018, Yajima et al.
U.S. Appl. No. 16/093,320, filed Oct. 12, 2018, Niikura et al.
U.S. Appl. No. 16/236,067, filed Dec. 28, 2018, Yajima et al.
U.S. Appl. No. 16/735,460, filed Jan. 6, 2020, Yajima et al.
International Search Report and Written Opinion and English translation thereof dated Jul. 12, 2016 in connection with International Application No. PCT/JP2016/001925.
International Preliminary Report on Patentability and English translation thereof dated Nov. 23, 2017 in connection with International Application No. PCT/JP2016/001925.

\* cited by examiner

MANAGEMENT APPARATUS, INDIVIDUAL MANAGEMENT SYSTEM, AND INDIVIDUAL SEARCH SYSTEM

CROSS-REFERENCE TO RELATED APPLICATIONS

This application is a continuation of and claims the benefit under 35 U.S.C. § 120 of U.S. patent application Ser. No. 16/735,460, titled "MANAGEMENT APPARATUS, INDIVIDUAL MANAGEMENT SYSTEM, AND INDIVIDUAL SEARCH SYSTEM," filed on Jan. 6, 2020, now U.S. Pat. No. 10,729,107, which is a continuation of and claims the benefit under 35 U.S.C. § 120 of U.S. patent application Ser. No. 16/236,067, titled "MANAGEMENT APPARATUS, INDIVIDUAL MANAGEMENT SYSTEM, AND INDIVIDUAL SEARCH SYSTEM," filed on Dec. 28, 2018, now U.S. Pat. No. 10,609,907, which is a continuation of and claims the benefit under 35 U.S.C. § 120 of U.S. patent application Ser. No. 15/571,344, titled "MANAGEMENT APPARATUS, INDIVIDUAL MANAGEMENT SYSTEM, AND INDIVIDUAL SEARCH SYSTEM," filed on Nov. 2, 2017, now U.S. Pat. No. 10,212,922, which claims the benefit under 35 U.S.C. § 371 as a U.S. National Stage Entry of International Application No. PCT/JP2016/001925, filed in the Japanese patent Office as a Receiving Office on Apr. 6, 2016, which claims priority to Japanese Patent Application JP2015-097747, filed in the Japanese Patent Office on May 12, 2015, each of which is incorporated herein by reference in its entirety.

TECHNICAL FIELD

The present technology relates to a management apparatus, an individual management system, and an individual search system applicable to livestock pasturing management, for example.

BACKGROUND ART

From the past, for livestock breeders to manage activity states/health conditions of livestock, methods of directly grasping states of livestock have been performed, the methods including measurements of a body temperature, weight, physical condition, and the like by livestock breeders, observations by experts such as a veterinarian, and the like. Further, there is also proposed a method of grasping states by attaching, to necks of livestock, a monitoring apparatus equipped with a sensor that acquires biological information such as a body temperature and an acceleration of the livestock.

For example, Patent Literature 1 describes an animal managing system that is worn by individual animals to acquire individual-related information including position information, physiological information, peripheral image information, or peripheral micrometeorological information of an animal that moves while wearing this and collect the acquired individual-related information at remote locations.

CITATION LIST

Patent Literature

Patent Literature 1: Japanese Patent Application Laid-open No. 2004-222519

DISCLOSURE OF INVENTION

Technical Problem

For example, for livestock breeders, there are demands to specify a predetermined individual from a plurality of pastured livestock animals and perform individualized care.

In view of the circumstances as described above, the present technology aims at providing a management apparatus, an individual management system, and an individual search system with which a position of a specified individual satisfying a predetermined condition can be captured with ease.

Solution to Problem

A management apparatus according to an embodiment of the present technology includes a control unit.

The control unit extracts, on the basis of first information that is generated by a sensor device worn by an individual and is related to a living body of the individual, a specific individual satisfying a predetermined condition, and generates, on the basis of position information related to a position of the specific individual, search information for causing a mobile object to move to the position of the specific individual.

An individual management system according to an embodiment of the present technology includes a plurality of sensor devices and a management apparatus.

The plurality of sensor devices each include a detection unit that detects first information related to a living body of an individual and a first communication unit capable of transmitting the first information, the plurality of sensor devices being respectively worn by a plurality of individuals to be managed.

The management apparatus includes a control unit that extracts, on the basis of the first information, a specific individual satisfying a predetermined condition, and generates, on the basis of position information related to a position of the specific individual, search information for causing a mobile object to move to the position of the specific individual.

An individual search system according to an embodiment of the present technology includes a plurality of sensor devices, at least one relay apparatus, a mobile object, and a management apparatus.

The plurality of sensor devices each include a detection unit that detects first information related to a living body of an individual and a first communication unit capable of transmitting the first information, the plurality of sensor devices being respectively worn by a plurality of individuals to be managed.

The at least one relay apparatus includes a second communication unit capable of receiving the first information transmitted from each of the plurality of sensor devices and transmitting individual information of each individual including second information related to a communication state with the first communication unit and the first information.

The management apparatus includes a control unit that receives the individual information of each individual transmitted from the relay apparatus, extracts a specific individual satisfying a predetermined condition on the basis of the first information, generates position information related to a position of the specific individual on the basis of the second information, and generates search information for moving the mobile object to the position of the specific individual on the basis of the position information.

Advantageous Effects of Invention

As described above, according to the present technology, a position of a specific individual satisfying a predetermined condition can be captured with ease.

It should be noted that the effects described herein are not necessarily limited, and any effect described in the present disclosure may be obtained.

MODES FOR CARRYING OUT THE INVENTION

Hereinafter, embodiments of the present technology will be described with reference to the drawings.

First Embodiment

In this embodiment, descriptions will be given on an example where an individual management system or individual search system according to the present technology is applied to a livestock management system that manages pastured livestock such as beef cattle, dairy cattle, horses, sheep, and goats.

Figure 1:
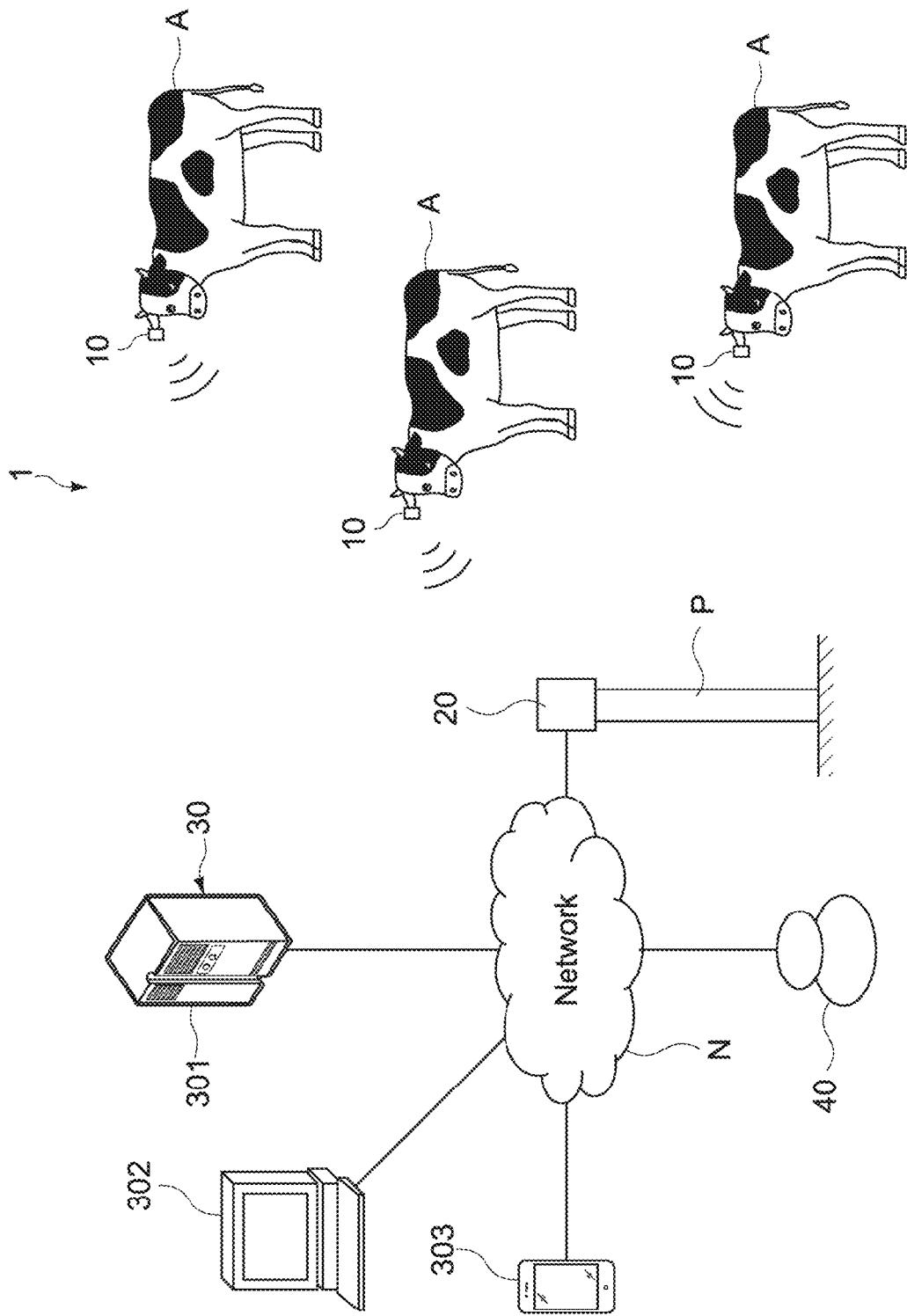
FIG. 1 A schematic configuration diagram of a system according to an embodiment of the present technology.
Figure 2:
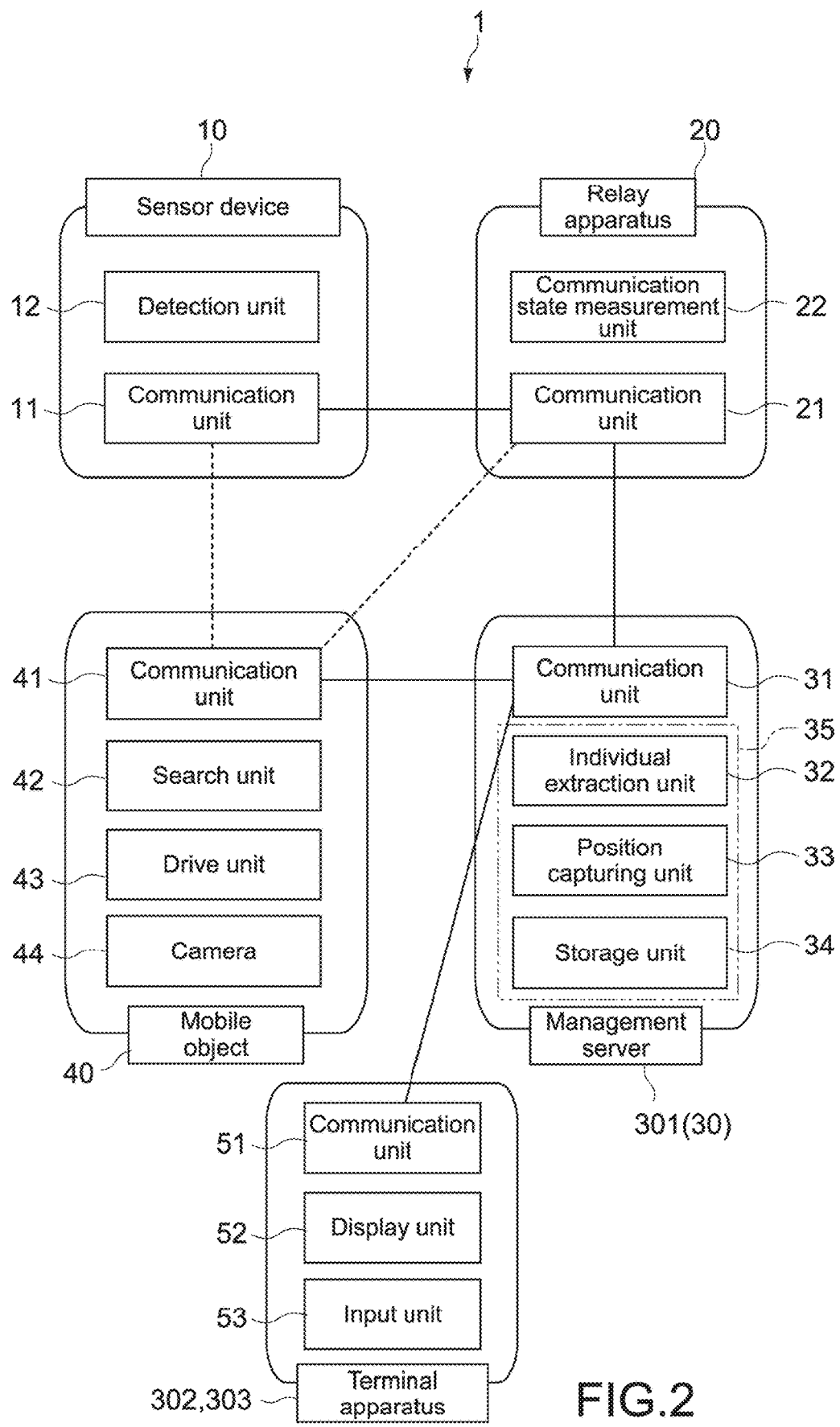
FIG. 2 A functional block diagram of the system.

FIG. 1 is a schematic configuration diagram of an individual management system or individual search system according to the embodiment of the present technology. FIG. 2 is a functional block diagram of the system. Hereinafter, an entire typical configuration of the system will be described.

[Entire Configuration of System]

A system 1 of this embodiment includes a plurality of sensor devices 10, a relay apparatus 20, a management apparatus 30, and a mobile object 40.

The system 1 includes a function of managing health conditions and activity states of a plurality of pastured livestock animals A, specifying and capturing a position of a livestock animal A requiring individual care, and further, searching for the livestock animal A.

It should be noted that although beef cattle are taken as an example of the livestock animals A in this embodiment, the livestock animals A may simply be referred to as "individual" in some cases.

(Sensor Device)

As shown in FIG. 1, the plurality of sensor devices 10 are respectively worn by the plurality of livestock animals A to be managed. Each of the sensor devices 10 is worn at a head, neck, body, foot, or the like of the livestock animal A, and is worn at an ear in this embodiment. The number of sensor devices 10 to be worn by the livestock animal A may either be single or plural.

It should be noted that the sensor device 10 is not limited to a case where it is attached to an ear of the livestock animal A and may be attached to parts other than the ear, such as a neck, back, and foot. However, it is more favorable to attach it to an ear than the neck and foot in view of lowering a possibility of the sensor device 10 coming off due to the livestock animal A rubbing its body against a fence or the like or the livestock animals A clashing with one another.

As shown in FIG. 2, each of the sensor devices 10 includes a detection unit 12 that detects information related to a living body of the livestock animal A (first information) and a communication unit 11 (first communication unit) capable of transmitting the information.

Unique identification information (UID: Unique Identification) for specifying the livestock animal A is given to each of the sensor devices 10. The detection unit 12 detects biological information (first information) that directly or indirectly indicates an activity state and health condition of the livestock animal A. The communication unit 11 transmits detection signals of the detection unit 12 mainly to the relay apparatus 20 together with the UID. The information is transmitted from each of the sensor devices 10 to the relay apparatus 20 at certain time intervals or irregular time intervals.

The sensor devices 10 typically include the same configuration. Each of the detection units 12 includes at least one power generation element capable of generating electric power in accordance with a peripheral environment. The communication unit 11 is configured to include a communication module and an antenna, for example, and is configured to transmit information related to a power generation amount of the power generation element using electric power supplied from the power generation element. It should be noted that the sensor devices 10 will be described later in detail.

(Relay Apparatus)

As shown in FIG. 1, the relay apparatus 20 is set at a structure P whose position is fixed, such as a pole, fence, and gate set in a pasture, for example. The number of relay apparatuses 20 to be set is not limited to one and can be set as appropriate in accordance with the largeness of the pasture or the like. In this embodiment, a plurality of relay apparatuses 20 are set in the pasture.

It should be noted that as will be described later, the relay apparatus 20 is not limited to that which is set at the structure P and may be configured by a part or all of the plurality of livestock animals A moving within the pasture or the mobile object 40. In other words, the relay apparatus 20 is not limited to a case where it is attached to something fixed in the pasture or attached to a non-living thing.

Each of the relay apparatuses 20 includes a communication unit 21 (second communication unit) as shown in FIG. 2. The communication unit 21 is configured to include a communication circuit and an antenna, for example, and is configured to be capable of receiving information (first information) transmitted from the communication units 11 of the sensor devices 10 worn by the plurality of livestock animals A in a periphery thereof. A communication method between the sensor devices 10 and the relay apparatus 20 is not limited in particular, but a wireless communication technology that uses electromagnetic waves such as radio waves, infrared rays, and light or sound waves, is typically adopted.

Each of the relay apparatuses 20 further includes a communication state measurement unit 22 that generates information related to a communication state between the communication unit 21 and the communication unit 11 of each of the sensor devices 10 (second information). The communication state measurement unit 22 is configured by a calculation apparatus such as a computer including a CPU, a memory, and the like.

The communication state measurement unit 22 detects or measures a transmission signal level from each of the sensor devices 10, a reception intensity in the relay apparatus 20, and the like as the communication state between each of the sensor devices 10 and the relay apparatus 20. The communication unit 21 is configured to transmit, to the management apparatus 30, individual information of each livestock animal A including the biological information (first information) transmitted from each of the sensor devices 10 and communication state information (second information) that is generated by the communication state measurement unit 22 and is related to the communication state.

The individual information transmitted from the relay apparatus 20 to the management apparatus 30 is configured as a dataset including identification information (UID) of the relay apparatus 20, position information of the relay apparatus 20, the biological information (first information), the communication state information (second information), the identification information (UID) of the sensor devices 10, and the like. The communication state information (second information) includes the transmission signal level of the relay apparatus 20, a reception signal intensity of information transmitted from each of the sensor devices 10, a reception time, and the like.

A communication method between each of the relay apparatuses 20 and the management apparatus 30 is not limited in particular, and a packet communication technology that uses a network N is used, for example. Typically, the individual information is transmitted from the relay apparatus 20 to the management apparatus 30 every time information is received from each of the sensor devices 10, but the information may be transmitted periodically or irregularly.

In a case where the relay apparatus 20 is mobile, the relay apparatus 20 may include means for acquiring position information of itself (e.g., GPS system), and in this case, the position information is incorporated into the dataset.

Typically, each of the relay apparatuses 20 is configured to be supplied with electric power from a power supply cable laid within the pasture. It should be noted that without being limited to this, a power generation element capable of generating electric power using natural energy, such as solar power generation, wind power generation, geothermal power generation, and hydropower generation, may also be included. Further, the connection between the relay apparatus 20 and the network N may be wireless communication or wired communication.

(Management Apparatus)

The management apparatus 30 is typically configured by a computer including a CPU, a memory for storing programs, and the like. In this embodiment, the management apparatus 30 is configured by a management server 301 as shown in FIG. 1.

As shown in FIG. 2, the management apparatus 30 includes a communication unit 31 (third communication unit) and a control unit 35. The control unit 35 includes an individual extraction unit 32, a position capturing unit 33, and a storage unit 34. The control unit 35 is configured to extract a specific individual satisfying a predetermined condition on the basis of the first information that is generated by the sensor devices 10 worn by the individuals and is related to a living body of the individuals, and generate, on the basis of position information related to a position of the specific individual, search information for moving the mobile object 40 to the position of the specific individual (position in real world indicating position of specific individual).

The control unit 35 is configured to generate, with respect to the mobile object 40, a guidance instruction for guiding the specific individual to a predetermined location (e.g., cowshed).

The individual extraction unit 32, the position capturing unit 33, and the like are configured by a calculation apparatus such as a computer including hardware resources such as a CPU and a memory.

The communication unit 31 is configured to include a communication circuit and an antenna, for example, and is configured to be capable of receiving the individual information of each livestock animal A transmitted from the respective relay apparatuses 20. The individual extraction unit 32 is configured to extract a specific individual satisfying a predetermined condition on the basis of the biological information (first information) included in the received individual information (dataset) of each livestock animal A.

Further, the communication unit 31 is configured to be capable of transmitting the search information and guidance instruction to the mobile object 40 and receiving mobile object information including information related to a position of the mobile object 40. The mobile object information can be acquired from a GPS (Global Positioning System) mounted on the mobile object 40, for example.

The predetermined condition is one or a plurality of conditions preset for specifying an individual to be searched and is typically a reference value used for judging whether a living body or activity state (body temperature, magnitude of activity amount, etc.) of the livestock animal A is abnormal. The predetermined condition may include a reference value used for judging whether the livestock animal A has moved to a location that is a predetermined distance or more apart from the relay apparatus 20. In a case where the detection unit 12 of each of the sensor devices 10 detects a plurality of types of biological information or activity information, the health condition or activity state of the livestock animal A is determined by comprehensively determining these pieces of information.

The individual extraction unit 32 evaluates whether the individual information of the individual livestock animals A satisfies the one or a plurality of predetermined conditions for specifying a search target. Examples of the search target include an individual that has become ill or been injured, an individual in estrus, and the like. The individual extraction unit 32 judges whether there is a specific individual satisfying the predetermined condition and when there is, extracts or specifies that individual as the search target (generation of search event).

The position capturing unit 33 is configured to generate position information related to the position of the specific individual on the basis of the communication state information (second information) included in the received individual information of each livestock animal A. In this embodiment, the position information related to the specific individual is generated at a time the specific individual is extracted by the individual extraction unit (when search event is generated). It should be noted that the present technology is not limited to this, and position information related to all individuals may be generated irrespective of whether a search event is generated.

As the position information, area information having a highest existence probability out of a plurality of areas obtained by virtually dividing the pasture, for example, is used. Since the position information is calculated on the basis of the information related to the communication state between the relay apparatus 20 and each of the sensor devices 10 (second information), it is not an absolute position but is a relative position that is calculated on the basis of a relationship of communication intensities with respect to other sensor devices, and the like. Therefore, the position information only needs to indicate a rough position within the pasture.

The storage unit 34 is configured by a storage apparatus such as a semiconductor memory and a hard disk drive and stores individual information of each livestock animal A transmitted from the relay apparatuses 20, information related to a specific individual extracted by the individual extraction unit 32, position information generated by the position capturing unit 33, and the like. The communication unit 31 is configured to transmit, as the search information, at least a part of the various types of information stored in the storage unit 34 to terminal apparatuses 302 and 303 and the mobile object 40 via the network N.

(Terminal Apparatus)

In this embodiment, a plurality of terminal apparatuses 302 and 303 are provided. The terminal apparatuses 302 and 303 are each configured by an information processing apparatus communicable with the management server 301 via the network N. The management server 301 is configured to include the individual extraction unit 32, the position capturing unit 33, and the storage unit 34 and execute monitoring of a state of each livestock animal A, position capturing processing, and the like.

The management server 301 is configured to transmit, at a time a search event is generated, that effect to the terminal apparatuses 302 and 303 and configured to execute a predetermined search process in accordance with instructions from the terminal apparatuses 302 and 303. When a plurality of individuals satisfying the predetermined condition are extracted, the search event may be generated regarding the plurality of individuals. In this case, one or a plurality of individuals to be searched for may be specified by the terminal apparatuses 302 and 303.

On the other hand, the terminal apparatuses 302 and 303 are each configured to be capable of acquiring individual information and position information of each livestock animal A, and the like from the management server 301 via the network N. The terminal apparatuses 302 and 303 are typically configured by a general-purpose computer including a communication function.

Specifically, as shown in FIG. 2, the terminal apparatuses 302 and 303 each include a communication unit 51 communicable with the management server 301, a display unit 52 that displays the individual information and position information of each livestock animal A, a history of biological information, the mobile object information, and the like transmitted from the management server 301, an input unit 53 that generates predetermined instruction signals to be transmitted to the management server 301, and the like. In this embodiment, the terminal apparatus 302 is configured by a stationary terminal apparatus, and the terminal apparatus 303 is configured by a mobile terminal apparatus such as a smartphone, but the number and types of terminal apparatuses are not limited in particular. It is also possible for the terminal apparatuses to be a glasses-type or watch-type wearable device, for example. The communication unit 51 is configured to include a communication circuit and an antenna, for example. The input unit 53 is configured by an input apparatus such as a mouse, a keyboard, and a touch sensor, for example.

Further, the management apparatus 30 is not limited to the case where it is configured by the management server 301 and may be configured by the terminal apparatus 302 or the terminal apparatus 303 or may be configured by combining the management server 301 and the terminal apparatuses 302 and 303.

(Mobile Object)

As shown in FIG. 2, the mobile object 40 includes a communication unit 41 (fourth communication unit) and a search unit 42. The mobile object 40 is configured to be capable of moving, upon receiving the search information generated on the basis of the position information that is generated by the management server 301 and is related to the position of the specific individual (livestock animal A), to a current position of the specific individual or a peripheral location.

The communication unit 41 is configured to include a communication circuit and an antenna, for example. The communication unit 41 is configured to be communicable with the management server 301 via the network N and is typically configured to acquire search information including individual information and position information of the livestock animal A from the management server 301. Moreover, the communication unit 41 is further configured to be mutually communicable with the sensor device 10 (communication unit 11) and the relay apparatus 20 (communication unit 21) by a wireless communication technology that uses electromagnetic waves such as radio waves, infrared rays, and light or sound waves, and the like. In this case, the communication unit 41 may be configured by a communication module (to be described later) similar to the sensor device 10. Further, the mobile object 40 may also be configured to function as a part of the plurality of relay apparatuses 20.

The search unit 42 may be configured by a calculation apparatus such as a computer that includes a CPU, a memory for storing programs, and the like, may include a measurement system such as a GPS (Global Positioning System), and controls drive of the mobile object 40 so that it reaches a target area within the pasture. Of course, it is also possible to acquire a relative position from the mobile object to the sensor device from a captured relative position of the sensor device even without including the GPS and control the movement to the target area. On the basis of the search information related to the livestock animal A, that has been received from the management server 301 via the communication unit 41, the search unit 42 searches for the specific individual from the plurality of livestock animals A within the pasture. Further, the search unit 42 includes a search mode (high-accuracy mode) for searching for the specific individual by receiving information from the relay apparatus 20 (communication unit 21) or each of the sensor devices 10 (communication units 11).

Although a flying object configured to be capable of flying autonomously is used as the mobile object 40 in this embodiment, the present technology is not limited thereto, and a traveling object configured to be capable of travelling autonomously on land, a mobile object capable of traveling autonomously in or above water, and the like may also be used. The mobile object 40 includes a drive unit 43 as shown in FIG. 2. In addition to the drive source such as an engine and a motor, the drive unit 43 includes a propeller for flying in the case of a flying object, wheels in the case of a traveling object, a screw and the like in the case of a mobile object that moves in or above water.

By configuring the mobile object 40 such that it can track the specific livestock animal, it becomes possible to display not only a position of a still individual but also a position of a moving individual. In other words, the mobile object 40 also includes a function as a display body (instruction body) that displays (instructs) a position of a searched livestock animal (specific individual) in a form recognizable by pasture-related officials (users) including a manager, a pasture owner, and the like. For example, in a state where the mobile object 40 is hovering (staying still in air) right above the searched livestock animal, the position of the mobile object 40 is indirectly displayed to the outside as a position of the livestock animal as the search target. In this case, the mobile object 40 may include, as a display apparatus, a light-emitting device capable of externally emitting light, such as an LED (Light Emitting Diode), a sound-emitting device capable of emitting a warning tone, such as a buzzer, and the like.

Alternatively, the mobile object 40 may include, as the display apparatus, a display member that can be hung down from right above the searched livestock animal toward the livestock animal, such as ropes and a net. In this case, the livestock animal is directly displayed by the display member.

The number of mobile objects 40 is not limited to one, and a plurality of mobile objects 40 may be provided. In the case of using the plurality of mobile objects 40, each of the mobile objects 40 may search for a livestock animal after dividing a search area. Accordingly, it becomes possible to search for a specific individual in a short time even if the pasture is extensive.

The mobile object 40 may include a camera 44 (image pickup apparatus) so that, accordingly, it becomes possible to photograph the surroundings and a livestock animal positioned right below a flying area. Moreover, a flight attitude, height, proximity distance with respect to a livestock animal, and the like of the mobile object 40 may be controlled on the basis of the image taken by the camera 44.

The mobile object 40 is configured to be capable of transmitting an output image of the camera 44 to the management apparatus 30 via the communication unit 41. Typically, the output image of the camera 44 is transmitted as the mobile object information together with the position information of the mobile object 40 (GPS data). The camera 44 may be an infrared camera so that, accordingly, it becomes possible to acquire, from a photographed thermography image of a livestock animal, specific condition data of the livestock animal that is different from data obtained from the sensor device 10 alone.

The mobile object 40 may further include a guidance tool for guiding the livestock animals. In this case, a specific livestock animal as a search target can be guided to a predetermined location such as a cowshed on the basis of a guidance instruction transmitted from the management apparatus 30.

A feed for livestock animals is typically used as the guidance tool. By using a concentrated feed that livestock animals favor in particular, a livestock animal guidance effect can be enhanced. The concentrated feed is a feed including many proteins, and an example thereof is a feed including seed parts of grains such as a corn, barley, wheat, and rice, beans such as a soybean, an oil cake obtained by squeezing oil, and the like. It should be noted that the guidance tool may be an artificial bait.

The mobile object 40 is configured to guide the livestock animal to a cowshed by hanging the guidance tool in front of the livestock animal, scattering it along the way back to the cowshed, and the like on the basis of the guidance instruction.

A battery is typically used as a power source of the mobile object 40, but a power generation element capable of generating electric power using natural energy, such as solar power generation and wind power generation, may be included instead.

[System Operation]

Next, typical operations of the system 1 of this embodiment will be described.

(General Outline of Operations)

In the system 1 of this embodiment, each of the relay apparatuses 20 receives biological information of the respective livestock animals A from the sensor devices 10 respectively worn by the livestock animals A (individuals), processes it into individual information, and transmits it to the management apparatus 30 (management server 301). The dataset configuring each individual information includes first information related to a living body of the livestock animal A transmitted from the sensor device 10 and second information related to a communication state with respect to the sensor device (first communication unit) at a time the information is received as described above.

The management apparatus 30 (management server 301) judges an activity state or health condition of individual livestock animals A on the basis of the first information in the respective pieces of individual information and judges whether the predetermined condition is satisfied. Further, the management apparatus 30 (management apparatus 301) typically judges, for each of the individual sensor devices 10, a distance between the sensor device 10 and the relay apparatus 20 on the basis of the second information in each individual information and generates position information related to a position of the livestock animal A satisfying the predetermined condition or positions of all the livestock animals A. Accordingly, a specific livestock animal A satisfying the predetermined condition is extracted, and a position of the specific individual is captured.

The management apparatus 30 (management server 301) executes the processing every time the individual information of the respective livestock animals A is received from the respective relay apparatuses 20. Accordingly, an individual management system capable of monitoring a time change (history) of the health condition or activity state of each individual is structured. Moreover, by collecting a time change of the position information of each livestock animal A in the storage unit 34, it becomes possible to also monitor the position and migration path of each individual as will be described later.

Then, the management apparatus 30 (management server 301, individual extraction unit 32) extracts a specific livestock animal A satisfying the predetermined condition, transmits, in a case where an urgent individual care is required for that livestock animal A, individual information and position information related to that individual to the mobile object 40, and causes the mobile object 40 to start searching for that livestock animal A. In other words, the system 1 of this embodiment functions as an individual search system that executes, in a case where a specific livestock animal A indicating a predetermined symptom or state, such as a disease and heat, is extracted, search processing of the specific livestock animal using a search event that has been generated for searching for the specific livestock animal as a trigger. The number of livestock animals A to be extracted as the search target is not limited to one, and a plurality of livestock animals may be extracted at the same time.

Next, details from the generation of a search event to an end of the search process will be described.

(Basic Algorithm)

Figure 3:
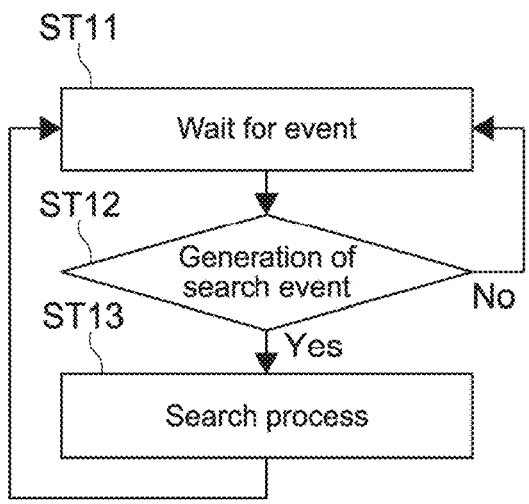
FIG. 3 A flowchart showing a basic algorithm of the system.

FIG. 3 is a flowchart showing a basic algorithm of the system 1.

The individual extraction unit 32 of the management apparatus 30 judges a health condition and activity state on the basis of individual information of each livestock animal A (ST11). As the individual extraction unit 32 extracts an individual satisfying a predetermined condition that is to become a reference for judging an abnormality such as a disease and heat, for example, from the individual information of each livestock animal A received by the management server 301, a search event is generated to shift to a search process for searching for the individual (ST12, 13).

Figure 4:
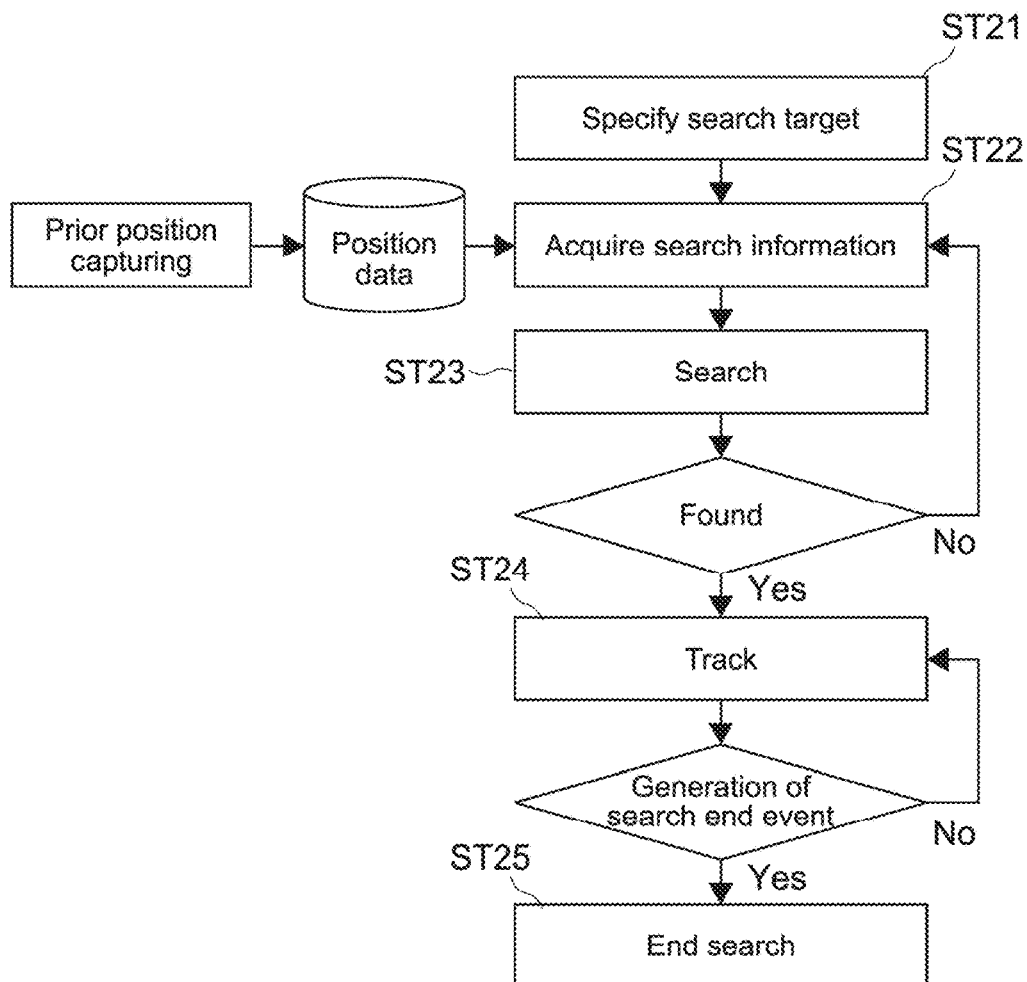
FIG. 4 A flowchart for explaining a general outline of a processing procedure of a search process in the system.

FIG. 4 is a flowchart of the system 1 for explaining a general outline of a processing procedure of the search process. In this embodiment, steps of search target specification (ST21), search information acquisition (ST22), search (ST23), track (ST24), and search end (ST25) are included.

(Generation of Search Event)

As a search event is generated, a search target is specified (ST21). A livestock animal extracted as the search target is typically specified on the basis of a UID (identification information) of the sensor device 10 worn by that livestock animal.

Subsequently, information related to the search target (search information) is acquired (ST22). As the search information, there are a transition of biological information up to present, a past medical history, an inveterate disease, and the like that are related to the livestock animal A, in addition to biological information related to a living body or activity amount of the livestock animal A as the search target and position information related to a current position. As the position information, information that is calculated and generated by the position capturing unit 33 of the management server 301 and stored in the storage unit 34 is referenced.

(Position Capturing Process)

Figure 5:
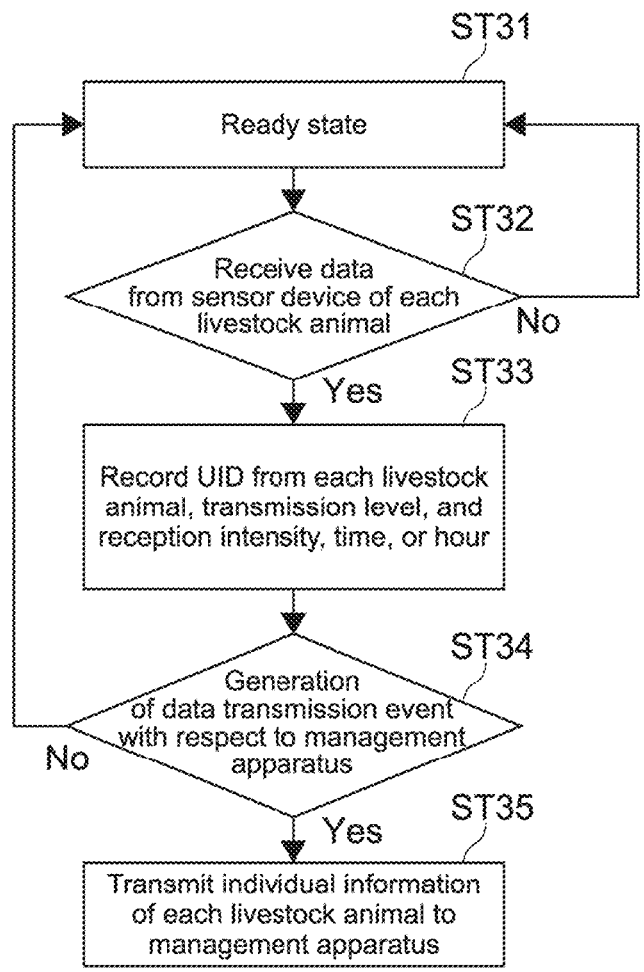
FIG. 5 A flowchart showing an individual position capturing process in the system and is a diagram for explaining a processing procedure of a relay apparatus.
Figure 6:
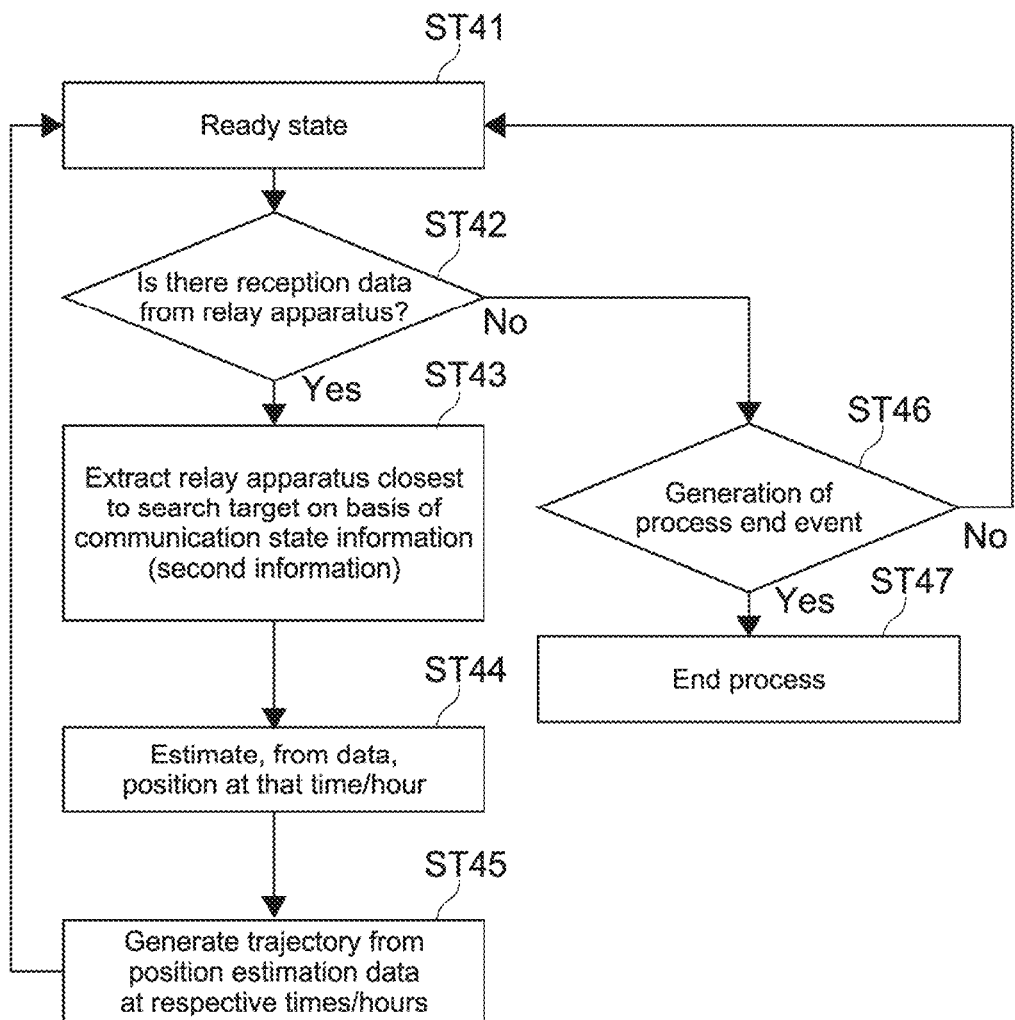
FIG. 6 A flowchart showing the individual position capturing process in the system and is a diagram for explaining a processing procedure of a management apparatus.

FIGS. 5 and 6 are each a flowchart showing a position capturing process of the livestock animal A. FIG. 5 shows operations of the relay apparatus 20, and FIG. 6 shows operations of the management apparatus 30 (management server 301).

Each of the relay apparatuses 20 transmits individual information of each livestock animal A to the management server 301. As shown in FIG. 5, each of the relay apparatuses 20 receives data from the sensor devices 10 worn by the respective livestock animals A in a ready state (ST31, 32). The data transmitted from each of the sensor devices 10 includes biological information (first information) including a health condition and activity state of the livestock animal A.

Each of the relay apparatuses 20 is configured to be capable of receiving data from one or a plurality of livestock animals A (sensor devices 10) within a communicable range. It is favorable for the plurality of relay apparatuses 20 to receive transmission data from the same livestock animal A.

Upon receiving the transmission data from the livestock animals A, each of the relay apparatuses 20 records, for each livestock animal A, information related to a communication state, that includes a transmission level, a reception intensity, a reception time, a reception hour, and the like (second information). These pieces of communication-related information are generated by the communication state measurement unit 22 (ST33). The processing described above is repetitively executed until a data transmission event with respect to the management server 301 is generated (ST34). Upon generation of a data transmission event, each of the relay apparatuses 20 transmits individual information including the first information and second information of the respective livestock animals A to the management server 301 (ST35).

The transmission level is a data transmission level of each of the sensor devices 10 and is typically included in the data transmitted from the sensor devices 10. The transmission level may be a fixed value, or may be a variable value that differs for each transmission as in a case where, for example, the transmission level is intensified or weakened intentionally at the time of transmission. Meanwhile, the reception intensity is a reception intensity of data transmitted from each of the sensor devices 10. Although the reception intensity is influenced by a communication environment, the reception intensity of signals to be received by the relay apparatus 20 is typically apt to become higher as the distance between the sensor device 10 that transmits data and the relay apparatus 20 that receives the data becomes smaller.

Therefore, on the basis of the information related to the communication state between the respective sensor devices 10 and the relay apparatuses 20 (transmission signal level of each sensor device 10 or reception intensity of each sensor device 10), it becomes possible to estimate the distances between the individual relay apparatuses 20 and the respective livestock animals A. For example, it becomes possible to estimate the distances between the individual relay apparatuses 20 and the respective livestock animals A by lowering the transmission signal levels of the respective sensor devices 10 from a high level and detecting whether the reception intensity can maintain a certain value or more.

The data transmission event is configured to be generated at a time point a built-in timer of each of the relay apparatuses 20 reaches a predetermined number of counts (predetermined cycle), for example. The data transmission event may be generated at a timing that differs for each of the relay apparatuses 20 or may be generated at the same timing. Alternatively, the data transmission event may be generated at a time point communication between the respective relay apparatuses 20 and the management apparatus 30 is established.

Meanwhile, the management server 301 receives the individual information of each livestock animal A from the respective relay apparatuses 20. As shown in FIG. 6, the management apparatus 30 judges whether there is reception data from the respective relay apparatuses 20 in a ready state (ST41, 42). Whether there is reception data is judged on the basis of reception information stored in the storage unit 34 (FIG. 2), for example.

Upon receiving the transmission data from the respective relay apparatuses 20, the management server 301 (position capturing unit 33) specifies a relay apparatus 20 closest to the specific livestock animal A out of the plurality of relay apparatuses 20 that have received data related to the position capturing target (specific livestock animal A as search target) at the same time or hour (ST43). Here, out of the plurality of relay apparatuses 20, a relay apparatus 20 that has a lowest transmission signal level of the sensor device 10 and has been able to receive that signal is extracted. If the reception intensity is maintained during the reception even when the transmission signal level is low, a distance between the position capturing target and the relay apparatus 20 is small as described above, so by the processing above, the relay apparatus 20 closest to the specific livestock animal A is specified.

Subsequently, the management server 301 (position capturing unit 33) estimates, on the basis of the reception data from the relay apparatus 20 closest to the specific livestock animal A, a position of that livestock animal A at a reception time thereof and generates position information related to that position (ST44). The generated position information is stored in the storage unit 34.

The reception time typically refers to a standard local time (absolute time) but is not limited thereto, and may be a time that has elapsed since system activation or generation of a search event (relative time), for example.

Next, the management server 301 (position capturing unit 33) references the position information related to the specific livestock animal, that has been generated last time, and additionally generates trajectory information related to a positional change of the livestock animal A (ST45). The generated trajectory information is stored in the storage unit 34.

The processing described above is repetitively executed until a search process end event is generated (ST46, 47).

It should be noted that the position capturing of a specific livestock animal A is not limited to the example where it is carried out on the basis of information transmitted from the relay apparatus 20. For example, as will be described later, it is also possible to directly receive position information of a specific livestock animal from a plurality of other livestock animals and capture the position of the specific livestock animal.

(Image Shift of Terminal Apparatus)

Search information acquired in the search information acquisition step (ST22) of FIG. 4 is transmitted to each of the terminal apparatuses 302 and 303 from the management server 301. In this embodiment, the search process of a livestock animal that uses the mobile object 40 is started upon receiving a predetermined input instruction from the terminal apparatuses 302 and 303.

Figure 7:
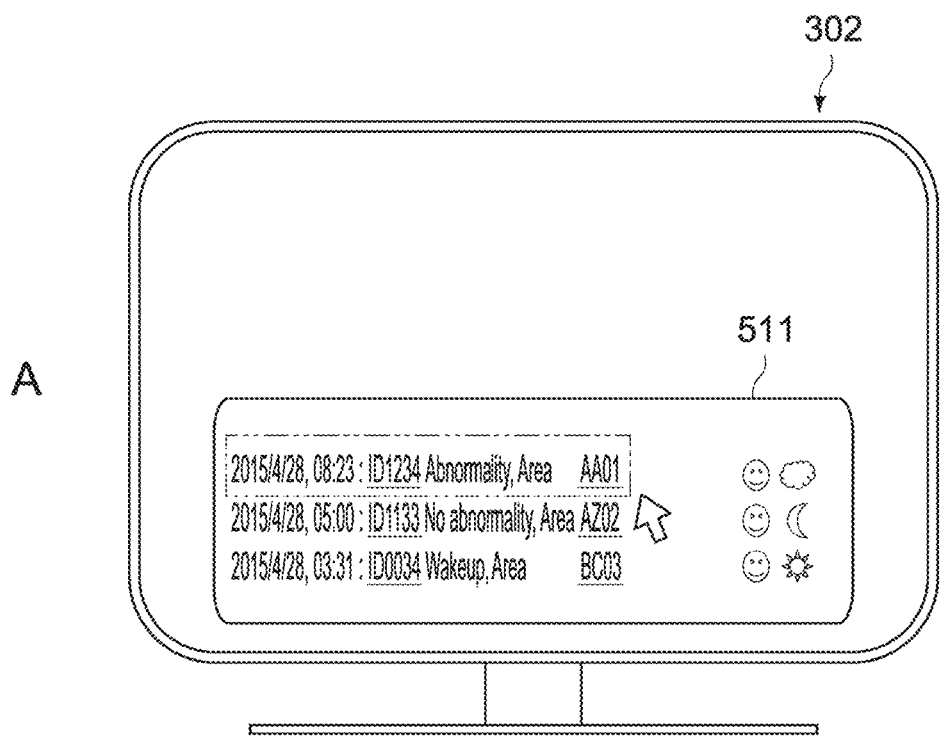
FIG. 7 Diagrams showing an example of a screen shift of the management apparatus in the system.
Figure 7:
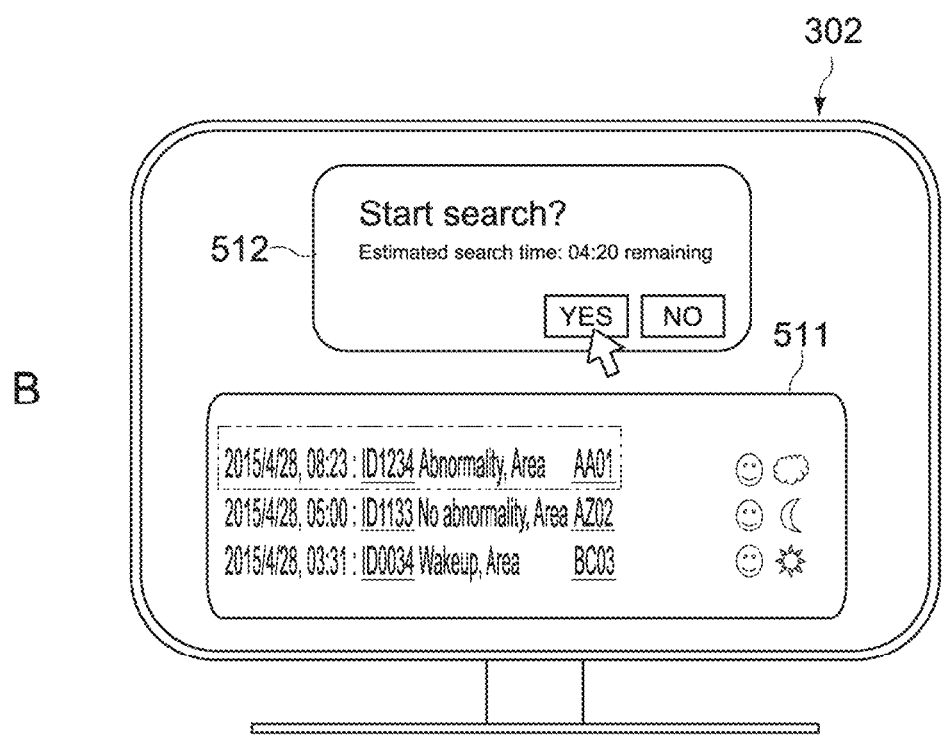

For example, FIGS. 7A and B show an example of a screen shift of the terminal apparatus 302.

Upon generation of a search event, a UI (User Interface) image 511 including information of a specific livestock animal A as a search target is displayed on a display (display unit 52) of the terminal apparatus 302 (FIG. 7A). In this example, the UI image 511 includes identification information (UID), position information, past history, and the like of the livestock animal A (sensor device) that has been judged as abnormal. The position information may be displayed in characters, or the position of the livestock animal A (estimated area) may be displayed on a map image displayed on the display. As a predetermined input operation (e.g., click operation) is made on the UI image 511, a UI image 512 that receives an input on whether to start a search is displayed (FIG. 7B).

Figure 8:
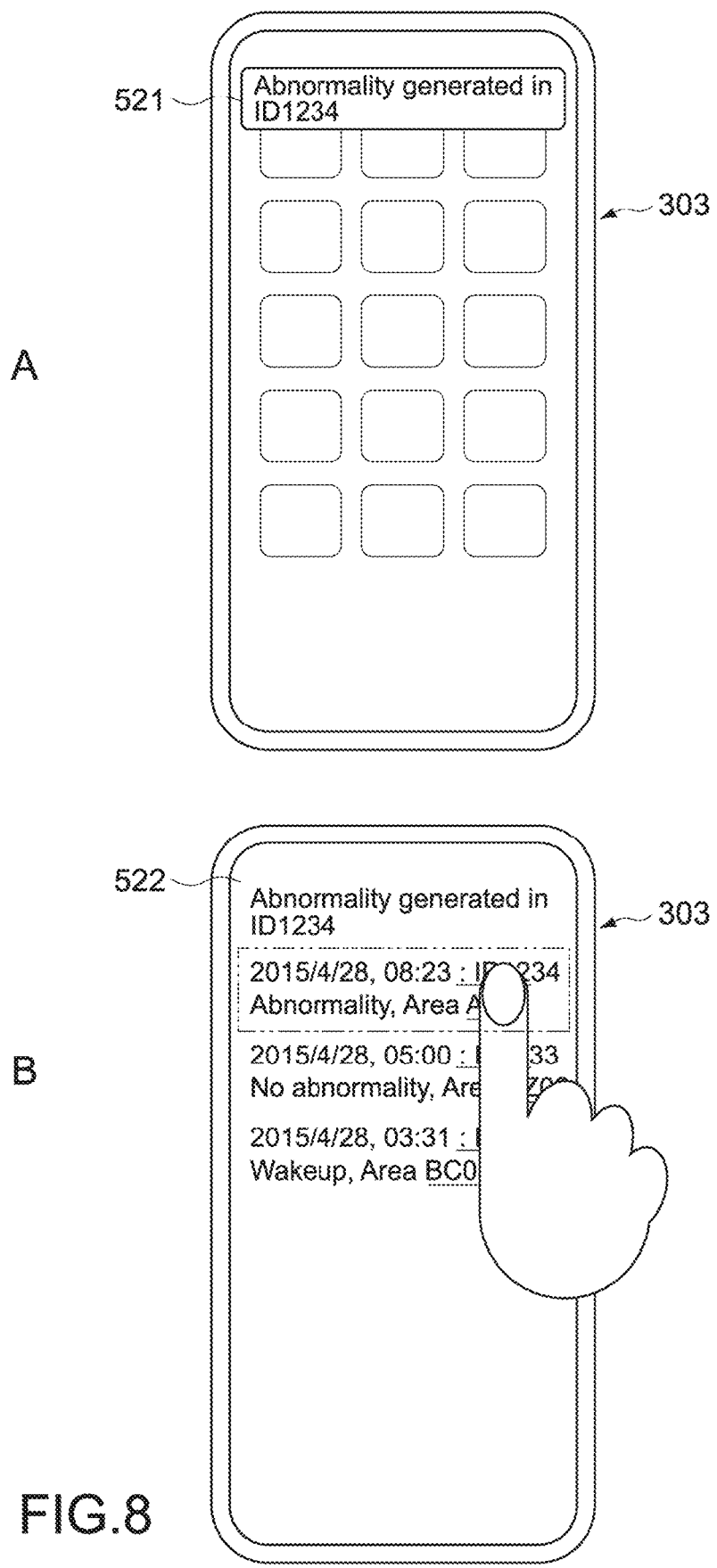
FIG. 8 Diagrams showing an example of a screen shift of the management apparatus in the system.
Figure 9:
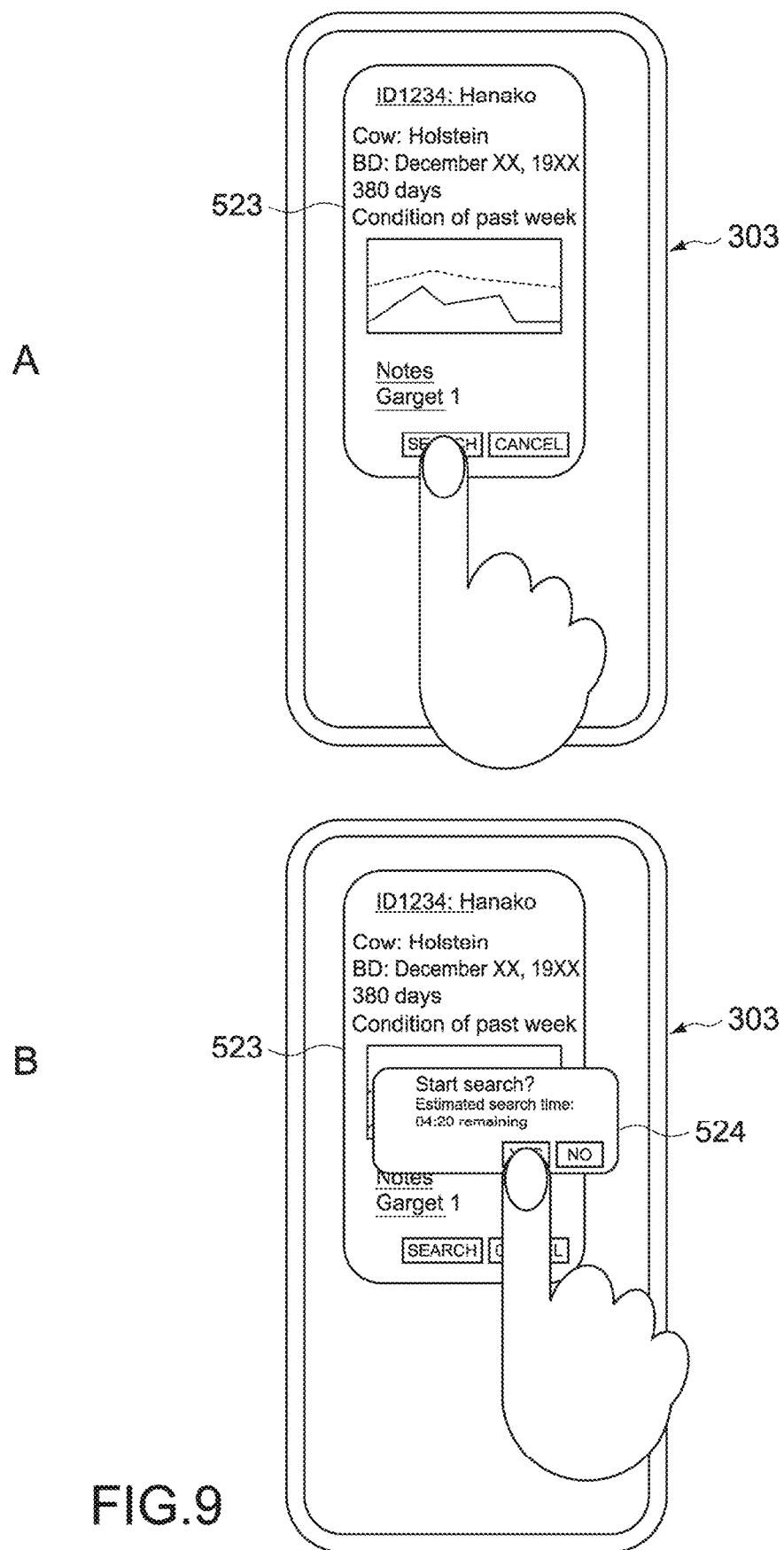
FIG. 9 Diagrams showing an example of a screen shift of the management apparatus in the system.

Meanwhile, FIGS. 8A and B and FIGS. 9A and B each show an example of a screen shift of the terminal apparatus 303.

Upon generation of a search event, a UI image 521 including identification information (UID) of a specific livestock animal as a search target is displayed on a display (display unit 52) of the terminal apparatus 303 (FIG. 8A). As a predetermined input operation (e.g., tap operation) is made on the UI image 521, a UI image 522 including simple data of the livestock animal A (e.g., position information, past history, etc.) judged as abnormal is displayed (FIG. 8B). The position information may be displayed in characters, or the position of the livestock animal A (estimated area) may be displayed on a map image displayed on the display. Next, as a predetermined input operation (e.g., tap operation) is made on the UI image 522, a UI image 523 indicating a type, date of birth, biological change of past week, notes, and the like of the livestock animal A is displayed (FIG. 9A), and a UI image 524 that receives an input on whether to start a search is displayed after a predetermined operation is made (FIG. 9B).

The management server 301 that has received a search start instruction from the terminal apparatus 302 or the terminal apparatus 303 starts a search process of the livestock animal A using the mobile object 40 (ST23). Specifically, on the basis of the position information of the livestock animal A generated by the management server 301 or the search information including the position information of the livestock animal A to be transmitted after that, the mobile object 40 flies above the pasture and searches for the livestock animal A (ST23). When found, the mobile object 40 stops above the livestock animal A and tracks the livestock animal A when it moves to thus display the position of the livestock animal A to a manager (ST24). After the manager specifies the livestock animal A, the search process is ended, and the mobile object 40 returns to a standby position (ST25).

Figure 10:
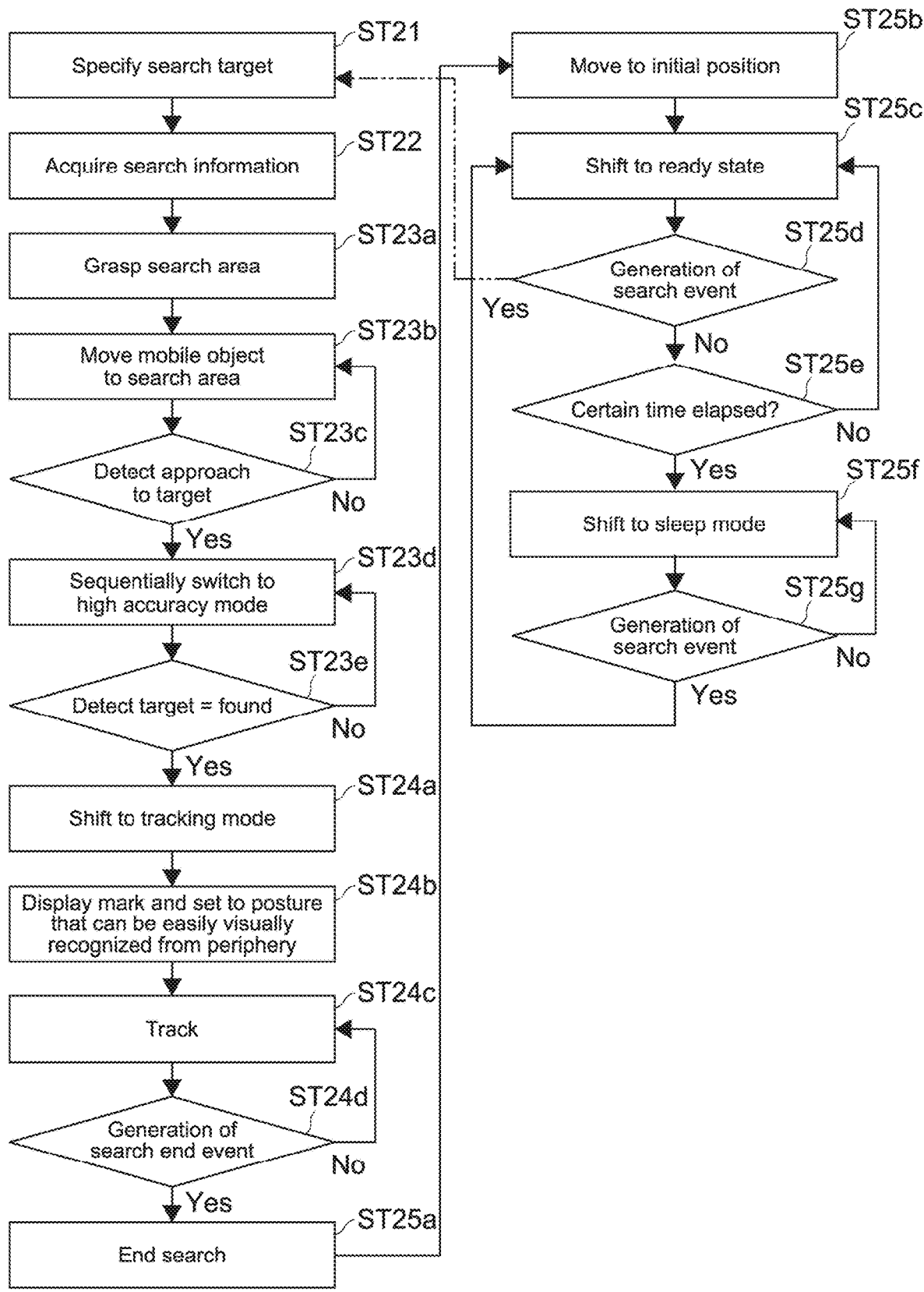
FIG. 10 A flowchart for explaining details of the processing procedure of the search process.

FIG. 10 is a flowchart of the system 1 for explaining details of the processing procedure of the search process. In FIG. 10, ST23a to 23e correspond to the search step (ST23) of FIG. 4, and ST24a to 24d correspond to the tracking step (ST24) of FIG. 4. Further, in FIG. 10, ST25a to 25g correspond to the search end step (ST25) of FIG. 4.

FIGS. 11 to 16 are each a schematic diagram for explaining the search process of a livestock animal A by the mobile object 40. In FIGS. 11 to 16, a pasture F is drawn substantially rectangularly, and a total of 5 relay apparatuses 20 (20A to 20E) are respectively installed at 4 corners and center position thereof. In addition, in the pasture F, 10 livestock animals A (A1 to A10) are pastured, and of those, a livestock animal A6 indicated by a black inverted triangle indicates a specific livestock animal as a search target.

Hereinafter, details of the search process will be described with reference to FIGS. 10 to 16.

(Search Process)

After the search target specification step (ST21) and search information acquisition step (ST22) are ended, a step of grasping a search area is executed (ST23a).

Figure 11:
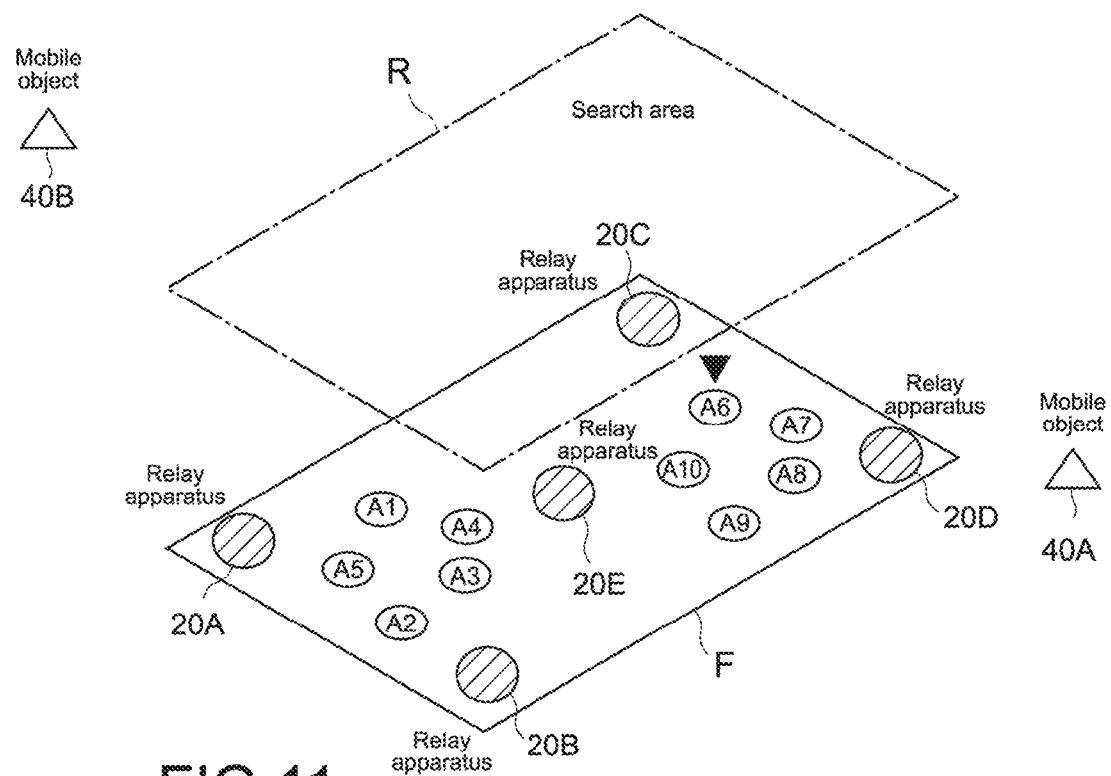
FIG. 11 A schematic diagram for explaining operations of a mobile object in the search process.

As shown in FIG. 11, a search area R is typically set within the entire area of the pasture F where the livestock animals A are pastured.

Alternatively, the search area R may be set within a range obtained by calculating a time required for the mobile object 40 to reach a search target from a movement velocity of the mobile object 40 and a rough position of the search target, the range being a range where the search target is highly likely to move before the mobile object 40 reaches the vicinity of the search target. Moreover, the search area R may be determined by the number of search targets. Alternatively, the search area R may be statically or dynamically assigned in advance to be used in the search process. Furthermore, the search area R may be a setting location of the relay apparatus 20C closest to the livestock animal A6 as the search target. In this case, the mobile object 40 may directly receive data from the relay apparatus 20C and acquire position information of the search target.

Since an unmanned flying object is used as the mobile object 40 in this embodiment, the search area R is set within an arbitrary height range above the pasture F. Further, in a case of using a plurality of mobile objects 40A and 40B as shown in FIGS. 11 to 16, search areas that differ from each other may be respectively allocated to the mobile objects 40A and 40B. Moreover, one of the mobile objects may be used as a backup at a time a failure or the like occurs in the other mobile object. Furthermore, for example, it may be used for the purpose of estimating a distance between the search target and the mobile object 40 more accurately as in specifying a search target direction by, for example, a three point survey using only the mobile object 40 and the search target, and the like.

Figure 12:
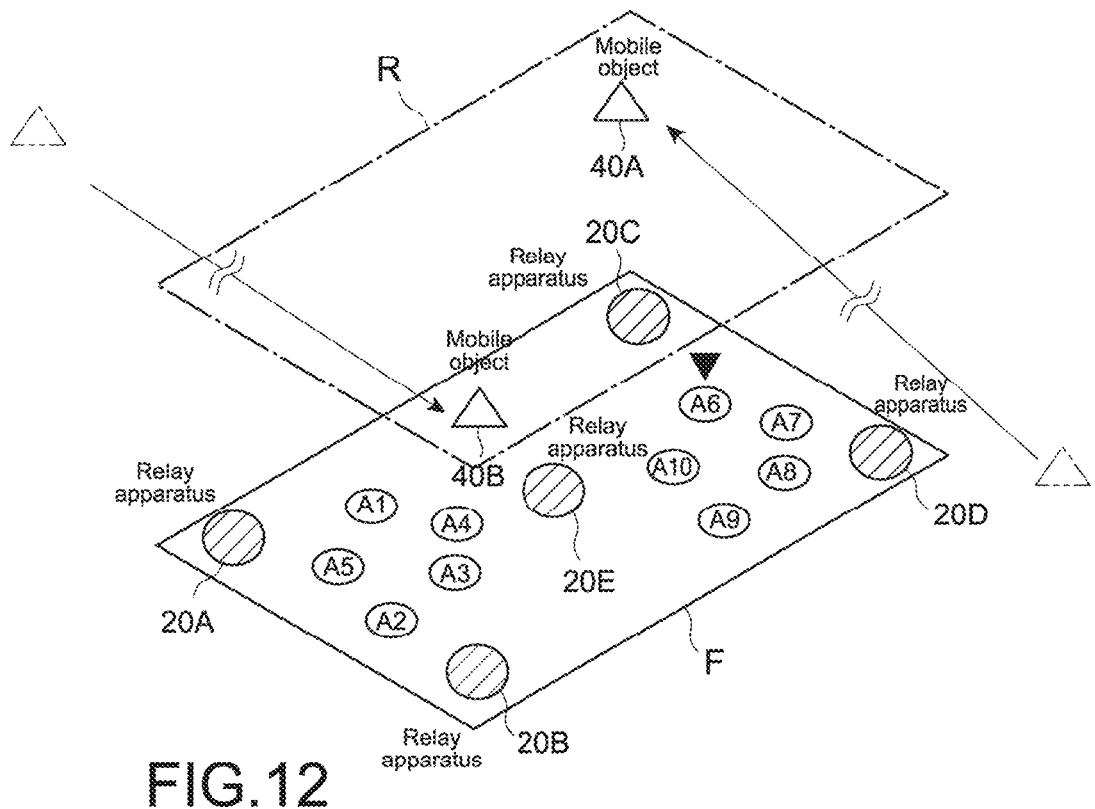
FIG. 12 A schematic diagram for explaining operations of the mobile object in the search process.

Subsequently, the management server 301 outputs a movement instruction to the mobile object 40 (40A, 40B) via the network N and causes the mobile object 40 (40A, 40B) to move to the search area R from a predetermined initial position (standby position) as shown in FIG. 12 (ST23b).

The predetermined initial position (standby position) is not limited in particular and can be set as appropriate in accordance with the type of mobile object, and it may be a standby location in air, on ground, above water, or in water, a dedicated standby location, and the like.

Figure 13:
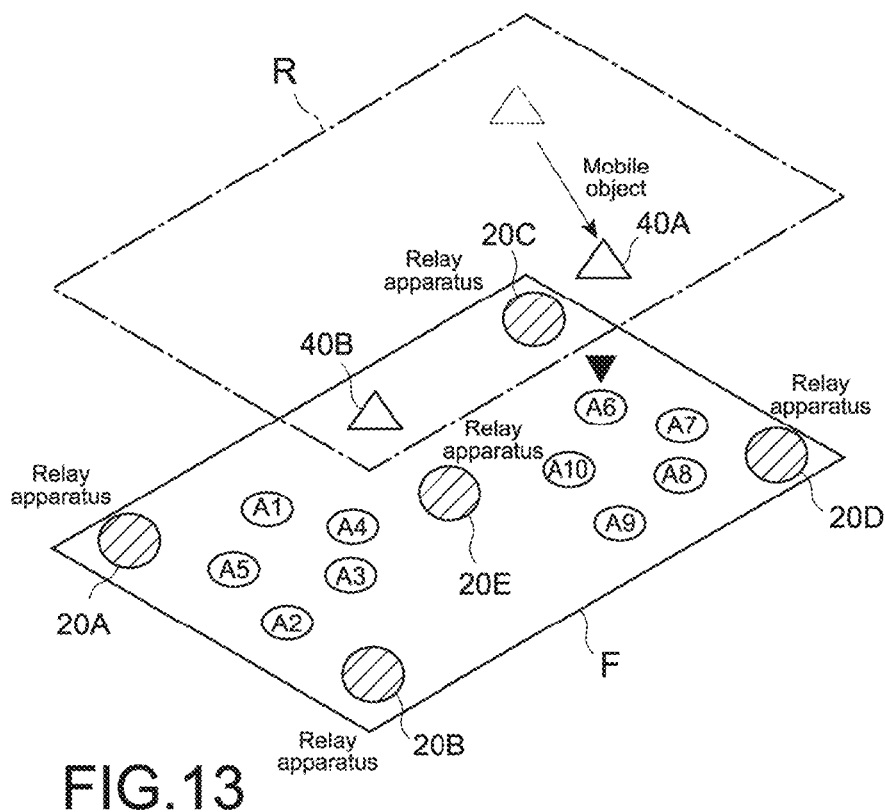
FIG. 13 A schematic diagram for explaining operations of the mobile object in the search process.

The mobile object 40 (40A, 40B) receives the position information of the livestock animal A6 as the search target that has been transmitted from the management server 301 via the communication unit 41 and moves to an estimated existence position of the livestock animal A6 under control of the search unit 42 based on that position information as shown in FIG. 13. As the flight route at this time, the movement may be directly made to the estimated existence position of the livestock animal A6, or if position information of the position where the relay apparatus 20C exists is known, the movement may be made to the estimated existence position of the livestock animal A6 after flying to the position of the relay apparatus 20C.

Upon detecting an approach to a destination (position where search target is estimated to be at) by a built-in positioning system, the search unit 42 shifts to a high accuracy mode that enables communication to be made with the livestock animal A (sensor device 10) (ST23c, 23d). Hereinafter, a case where the mobile object 40A as one of the two mobile objects 40A and 40B approaches a search target (livestock animal A6) will be described.

It should be noted that the other mobile object 40B may be caused to stay still as it is at a predetermined position of the search area R as shown in FIG. 13 or may be caused to return to the initial position (standby position). In the former case, the mobile object 40B may search for an individual as a search target in place of the mobile object 40A when that individual moves to an area that the mobile object 40B is in charge of.

The mobile object 40A flies while lowering the altitude to a distance that enables communication to be performed with peripheral livestock animals A in the vicinity of the destination. In a case where there are several livestock animals A at the destination, the search unit 42 acquires identification information of the individual livestock animals A and judges whether each of them is the livestock animal A6 as the search target. Then, upon finding the individual A6 as the search target, a shift is made to a tracking mode (ST23e, 24a).

(Tracking Process)

Figure 14:
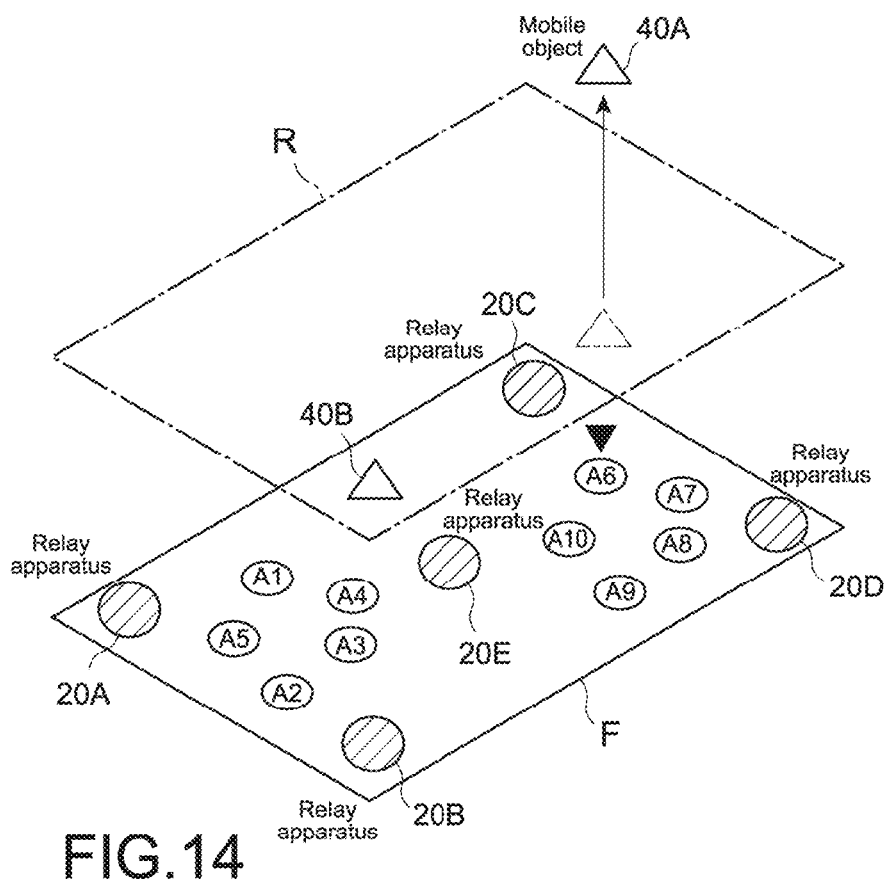
FIG. 14 A schematic diagram for explaining operations of the mobile object in the search process.

After shifting to the tracking mode, the mobile object 40A rises to a predetermined altitude for enabling the mobile object 40A to be visually recognized from farmers on the ground while being positioned right above the livestock animal A6 as shown in FIG. 14 (ST24b). The predetermined altitude is not limited in particular and can be set as appropriate in accordance with the size of the pasture F, whether there is unevenness or a height thereof, and the like.

Figure 15:
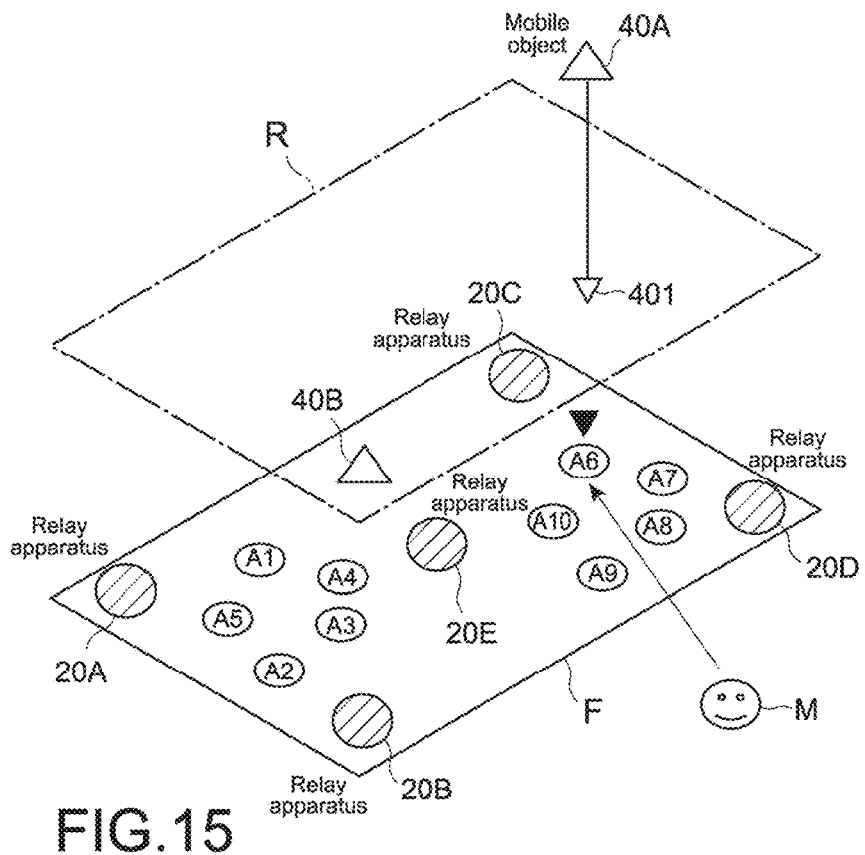
FIG. 15 A schematic diagram for explaining operations of the mobile object in the search process.

Alternatively, as shown in FIG. 15, so as to enable the livestock animal A6 positioned right below to be easily identified from peripheral livestock animals by a pasture-related official M, the mobile object 40A may hang down an appropriate display member 401 such as ropes and a net as a mark toward the livestock animal (ST24b).

Alternatively, the mobile object 40A may notify the pasture-related official of the location of the livestock animal A6 using its altitude. In other words, there is a fear that when the altitude of the mobile object 40A is too high, it becomes difficult to see the mobile object 40A itself from the ground and the visibility of the pasture-related official will be lowered. In this regard, by the mobile object 40A hanging down the display member 401 as the display apparatus toward the livestock animal A6 on the ground as described above in a case of flying at a relatively-high position such as an altitude of 30 m (meters), for example, the visibility of the pasture-related official can be enhanced.

On the other hand, in a case of flying at a relatively-low position such as an altitude of 5 m (meters), for example, the mobile object 40A activates a light-emitting device or sound-emitting device as the display apparatus. By using display means that does not inhibit the flight of the mobile object 40A in this way, a search target can be safely notified to the pasture-related official.

When the livestock animal A6 as the search target is found, the mobile object 40A may transmit a flying position (output of GPS sensor) of the mobile object 40A to the management server 301 as mobile object information, in place of or in addition to the display of the position of the livestock animal A6 using the display apparatus described above. The mobile object information may be directly transmitted to the management server 301 or may be transmitted to the management server 301 via the relay apparatus 20. The mobile object information is transmitted to the terminal apparatuses 302 and 303 via the management server 301 and displayed on the display unit 52 of the terminal apparatuses 302 and 303 as map information including the flying position of the mobile object 40A.

The flying position typically corresponds to a position right above the livestock animal A6, so it indicates the position of the livestock animal A6 more accurately. For example, in a case where initial information that notifies the position of the livestock animal A6 is relatively rough as in the case of the position of the relay apparatus 20C or the like, the livestock animal A6 can be found with ease by the pasture-related official by notifying the position of the mobile object 40A.

Further, the mobile object 40A may photograph the found livestock animal A6 with the camera 44 and transmit an output image thereof to the management server 301 as mobile object information together with the position of the mobile object 40A. The output image of the camera 44 is transmitted to the terminal apparatuses 302 and 303 via the management server 301. Accordingly, it becomes possible for the pasture-related official to check the image of the livestock animal A6 displayed on the display unit 52 of the terminal apparatuses 302 and 303, and thus the state of the livestock animal A6 can be grasped in a case where it cannot be captured immediately, and the like. Moreover, in a case where the camera 44 is an infrared camera, it becomes possible to acquire, from a photographed thermography image of a livestock animal, specific condition data of the livestock animal that is different from data obtained from the sensor device 10 alone.

Figure 16:
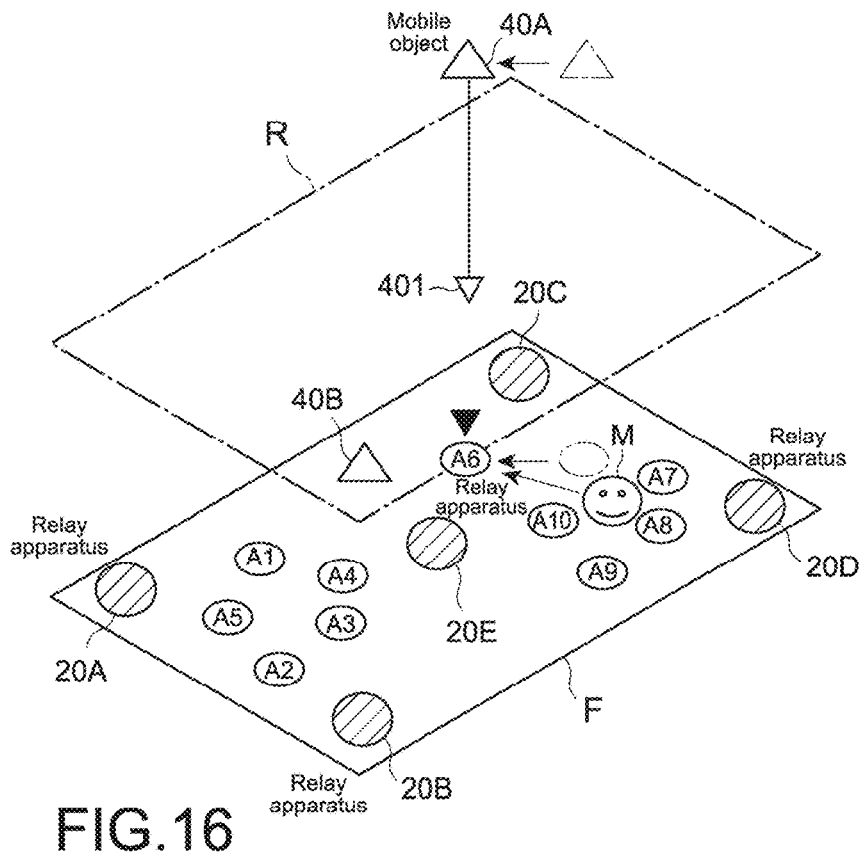
FIG. 16 A schematic diagram for explaining operations of the mobile object in the search process.

Meanwhile, in some cases, the livestock animal A6 moves within the pasture so that the position fluctuates from the original destination. In this case, the mobile object 40A is controlled so as to track the livestock animal A6 while flying above it as shown in FIG. 16 (ST24c). The mobile object 40A is continuously controlled to track the livestock animal A6 until the livestock animal A6 is captured by the pasture-related official M.

It should be noted that in a case where the abnormality detection of the livestock animal A6 notifies that the livestock animal A6 has moved to a location too far from the relay apparatus 20C, the mobile object 40A may be caused to function as the relay apparatus 20. Accordingly, even when the livestock animal A6 moves out of the range of the relay apparatus 20C, and the like, the condition detection of the livestock animal A6 can be performed via the mobile object 40A.

Also in this case, by transmitting not only the output of the sensor device 10 worn by the livestock animal A6 (first information) but also the position information of the mobile object 40A or the output image of the camera 44 to the management server 301 as the mobile object information, the position and condition of the livestock animal A6 can be acquired more accurately.

(End of Search Process)

Upon capturing the livestock animal A6, the management apparatus 30 generates a search end event (ST24d). The search end event is generated by a predetermined input operation to the terminal apparatus 303 carried by the pasture-related official M, for example, and a search end instruction is transmitted to the mobile object 40 (40A, 40B). Accordingly, the search of a livestock animal by the mobile object 40 (40A, 40B) is ended, and the mobile object (40A, 40B) returns to the initial position (ST25a, 25b). The mobile object 40 (40A, 40B) shifts to a ready state after that and shifts to a sleep mode after an elapse of a certain time without generation of a next search event (ST25c to 25f). After that, when a search event is generated again (ST25g), the mobile object 40 is restored to the ready state and resumes the search process described above.

(Guidance Process)

In place of or subsequent to the capturing of the livestock animal A6 by the pasture-related official, a guidance process of guiding the livestock animal A6 to a predetermined location such as a cowshed by the mobile object 40A may be executed.

The guidance process is executed by the management server 301 generating a guidance instruction for guiding the livestock animal A6 to a cowshed and transmitting that guidance instruction to the mobile object 40A. The generation of a guidance instruction is typically started with an input from the terminal apparatuses 302 and 303 of the pasture-related officials to the management server 301 being a trigger.

The mobile object 40A executes a predetermined operation of guiding the searched livestock animal A6 to the cowshed on the basis of the guidance instruction. As the predetermined operation, for example, there is a method of attracting attention of the livestock animal A6 by scattering, from the mobile object 40A, a guidance tool such as a concentrated feed that the livestock animal A6 eats favorably along the way home to the cowshed or hanging the guidance tool before the nose of the livestock animal A6. In the latter case, the guidance tool may be attached at a tip end of the display apparatus described above, or the like.

The predetermined operation includes, in addition to that described above, an operation in which the mobile object 40A itself guides the livestock animal A6 to the cowshed. For example, it is also possible to forcibly guide the livestock animal A6 by causing the mobile object 40A to operate as a sheepdog as in a case where the mobile object 40A approaches the livestock animal A6 and emits sound or light that the livestock animal A6 dislikes or applies an electrical shock to the livestock animal A6. In this case, a generator of the sound, light, electricity, or the like corresponds to the guidance tool.

It should be noted that the guidance process is also applicable to a case of searching for or guiding, when accommodating a herd of pastured livestock animals in a cowshed or the like, a livestock animal that has been separated from the herd, for example.

As described above, according to this embodiment, an individual satisfying a specific condition can be specified and captured with ease.

Specifically, from the past, for specifying an individual satisfying a specific condition, many processes have been necessary since whether there is an individual satisfying a specific condition needs to be grasped and specified by visual contact. In addition, in a case where it is unable to be specified, for example, problems that a livestock animal gives birth, a livestock animal not intended to go on a breeding program starts a breeding behavior, becomes critical, and the like arise.

With respect to the problems as described above, according to this embodiment, an individual satisfying a specific condition can be efficiently and positively captured, so it becomes possible to perform appropriate individual care on that individual.

Further, according to this embodiment, since the individual information of each livestock animal A transmitted from the respective relay apparatuses 20 to the management apparatus 30 includes information related to the communication state with respect to the respective relay apparatuses 20, a distance between an arbitrary relay apparatus 20 and a specific livestock animal A can be grasped on the basis of that information, and thus it becomes possible to estimate the position information of that livestock animal A.

Therefore, since it becomes possible to capture the position of an individual even when the individual sensor devices 10 do not include a GPS system, the sensor devices 10 can be produced at low costs, and power requisite for driving the GPS system becomes unnecessary, with the result that it becomes possible to miniaturize the sensor devices 10.

Furthermore, according to this embodiment, since the mobile object 40 searches for and tracks the specific livestock animal A, the livestock animal A can be searched for without requiring manpower. Moreover, since a flying object is used as the mobile object 40, the livestock animal as the search target can be easily identified from the position of the mobile object 40 flying above. Accordingly, the livestock animal can be specified with ease even in a case where the pasture is extensive or bumpy, there are many obstructions such as buildings and trees, and the like. Furthermore, since a livestock animal can be specified with ease, that livestock animal A can be captured and accommodated in a short time, and thus it becomes possible to perform a speedy care on that livestock animal.

[Sensor Device]

Subsequently, the sensor device 10 will be described in detail.

Figure 17:
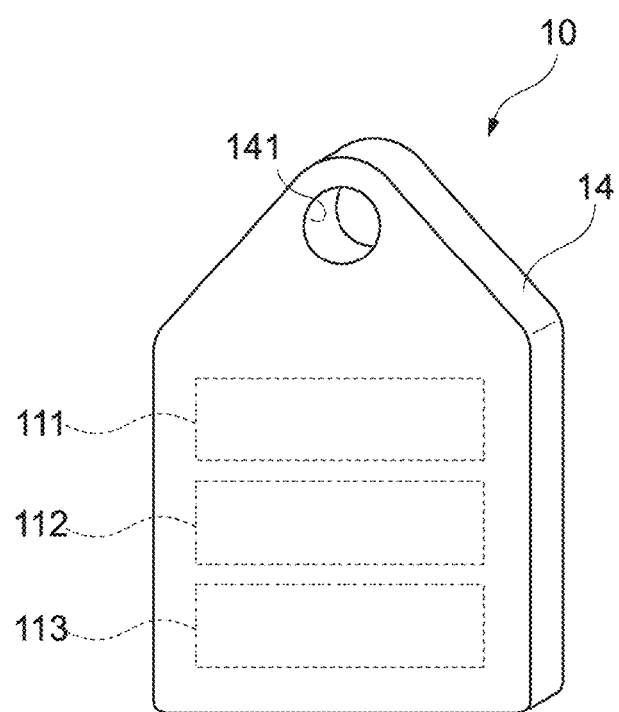
FIG. 17 A schematic configuration diagram of a sensor device in the system.

FIG. 17 is a schematic configuration diagram of the sensor device 10. The sensor device 10 includes a power generation unit 111 (corresponding to detection unit 12 in FIG. 2), a power storage element 112, and an output unit 113 (corresponding to communication unit 11 in FIG. 2).

The power generation unit 111 generates electric power in a manner that depends on a surrounding environment. The power generation unit 111 may be one that performs power generation with energy based on at least any one of, for example, light, heat, vibration, radio waves (far electromagnetic field and near electromagnetic field), and particular organic and inorganic matters. Any power generation methods can be employed and, for example, an electrostatic type, an electromagnetic type, an inverse magnetostrictive type, or a piezoelectric type can be employed.

The power generation unit 111 may perform power generation with light (e.g., indoor light bulb and solar light).

The power generation unit 111 may be a thermoelectric conversion element that performs power generation by utilizing a temperature difference (heat) (e.g., one that performs power generation by using Seebeck effect and Thomson effect, thermionic power generation element, or one that performs thermomagnetic generation).

The power generation unit 111 may be an enzyme battery (also called bio-battery or the like) that performs power generation by utilizing glucose.

The power generation unit 111 utilizes any of LCR (inductance, capacitance, and reactance) components or a combination thereof and capacitive coupling or electromagnetic coupling with a capacitor, an antenna, a rectenna, and the like. The power generation unit 111 may perform power generation with radio waves, for example.

The power generation unit 111 may perform electromagnetic field power generation, in other words, perform power generation with energy of an electromagnetic field such as electromagnetic waves obtained by bringing a sensor apparatus into the proximity of a predetermined device. A well-known method such as a magnetic field resonance method, an electromagnetic induction method, electric field coupling, an electric field resonance method, and a method that collects and uses radio waves of wireless LAN and the like can be applied to a method for near electromagnetic field power generation.

A well-known power generation element other than those exemplified above can be applied to the power generation unit 111.

The power storage element 112 is used in a manner that depends on purposes, for example, storing electric power generated by the power generation unit 111.

Besides various secondary batteries such as a lithium-ion secondary battery, the power storage element 112 includes an electric double layer capacitor, a lithium ion capacitor, a polyacenic semiconductor (PAS) capacitor, a Nanogate capacitor ("Nanogate" is a registered trademark of Nanogate Aktiengesellschaft), a ceramic capacitor, a film capacitor, an aluminum electrolytic capacitor, a tantalum capacitor, and the like. Depending on purposes, a combination of these power storage elements may be used.

The output unit 113 outputs power generation information of the power generation unit 111.

In this embodiment, the output unit 113 is configured to be switchable between a stand-by state and an output state in which output of the power generation information is possible in a manner that depends on electric power supplied from the power generation unit 111. With this, if a power generation amount of the power generation unit 111 becomes equal to or larger than a predetermined amount, it becomes possible to transmit predetermined information as power generation information indicating the fact of power generation of a power generation amount equal to or larger than the predetermined amount.

The output unit 113 includes, for example, an integrated circuit (IC) formed of one or more elements, a processor that controls outputs, and a communication module and antenna for communicating with the relay apparatus 20 and the mobile object 40.

Examples of the integrated circuit used in the output unit 113 can include a switching element such as a transistor, a diode, a reset IC, a regulator IC, a logic IC, and various arithmetic circuits. A circuit configuration inside the IC can be changed in a manner that depends on needs as long as it can realize the function of the output unit 13. Further, although the output unit 113 is favorably configured to be capable of retaining and storing a state after switching, the output unit 113 may be configured to be incapable of retaining and storing that state due to reset or the like.

Note that a description will be hereinafter made assuming that the reset IC is used as the integrated circuit of the output unit 113.

Further, electric power generated by the power generation unit 111 may be appropriately supplied to the output unit 113 after the voltage is increased or lowered.

The processor used in the output unit 113 controls the communication module. Examples of that processor can include an MPU (Micro Processing Unit) and a CPU (Central Processing Unit). The MPU is more favorable as the processor because of the throughput of the output unit 113 and a requirement for downsizing in the sensor device 1.

The communication performed by the communication module of the output unit 113 may be wireless or may be wired. Further, a wireless module may be single, may be of various types, or may be a composite module including the various types. The wireless communication may be communication utilizing electromagnetic waves (including infrared rays) or may be communication utilizing an electric field. Examples of a specific method therefor can include a communication method utilizing a band of several hundreds MHz (megahertz) to several GHz (gigahertz) such as "Wi-Fi (registered trademark)", "ZigBee (registered trademark)", "Bluetooth (registered trademark)", "Bluetooth Low Energy", "ANT (registered trademark)", "ANT+(registered trademark)", and "EnOcean (registered trademark)". Proximity wireless communication such as NFC (Near Field Communication) may also be employed.

In addition, the output unit 113 in the output state may transmit an identifier (ID) allocated to the power generation unit 111 as the power generation information. With this, the relay apparatus 20 and the management apparatus 30 are capable of determining from which power generation unit 111 the acquired power generation information comes.

The identifier may be allocated to each power generation unit 111 of the sensor device 10 or may be allocated to each module to be described later.

Note that the identifier may be an identifier allocated in advance or may be an identifier allocated as necessary. For example, when the sensor device 10 establishes communication connection with another device, an identifier may be allocated to each module and the allocated identifier may be used.

As shown in the FIG. 17, the sensor device 10 further includes a casing 14 that accommodates the power generation unit 111 and the output unit 113. The power storage element 112 may be also accommodated in the casing 14. All the modules to be described later can be accommodated in the casing 14. Note that the power generation unit 111, the power storage element 112, and the output unit 113 shown in the figure schematically show the fact that these elements are accommodated in the sensor device 10.

The casing 14 includes, for example, a hole for attachment 141. As shown in FIG. 1, the casing 14 is configured to be attachable to the livestock animal A via this hole 141. The casing 14 may be attached to the vicinity of an earmark for individual identification, for example.

The casing 14 may be, for example, formed of a resin material and the like such as an ABS resin, a polycarbonate resin, a polylactic acid, and a polyamide resin. At least a part thereof is formed of a light transmissive material capable of transmitting solar light therethrough.

Further, considering the ecology and the safety for living bodies and for preventing accidental ingestions, a material including a plant-derived material, an antiallergic material, an antibacterial material, or the like can be appropriately selected as the material of the casing 14.

In this embodiment, the sensor device 10 does not include structures including a lid or the like for replacement of a battery and a connector or the like for connecting to an external apparatus. Thus, the casing 14 can have a gas-tight structure such that the casing 14 can prevent external gas and liquid from entering it.

Specifically, the entire casing 14 can be integrally molded. Alternatively, if the casing 14 is configured by combining a plurality of parts, seal rings or the like can be provided at seams of the parts such that the respective parts of the casing 14 are held in close contact with each other.

Due to the casing 14 having such a gas-tight structure, the sensor device 10 can have a configuration excellent in water resistance, dust resistance, shock resistance, and corrosion resistance. With this, it is possible to provide the sensor device 10 excellent in durability also in a livestock breeding environment severe for the sensor apparatus, where it is liable to be affected by excrement and urine, weather, feed, dust, collision between livestock animals, and the like.

Figure 18:
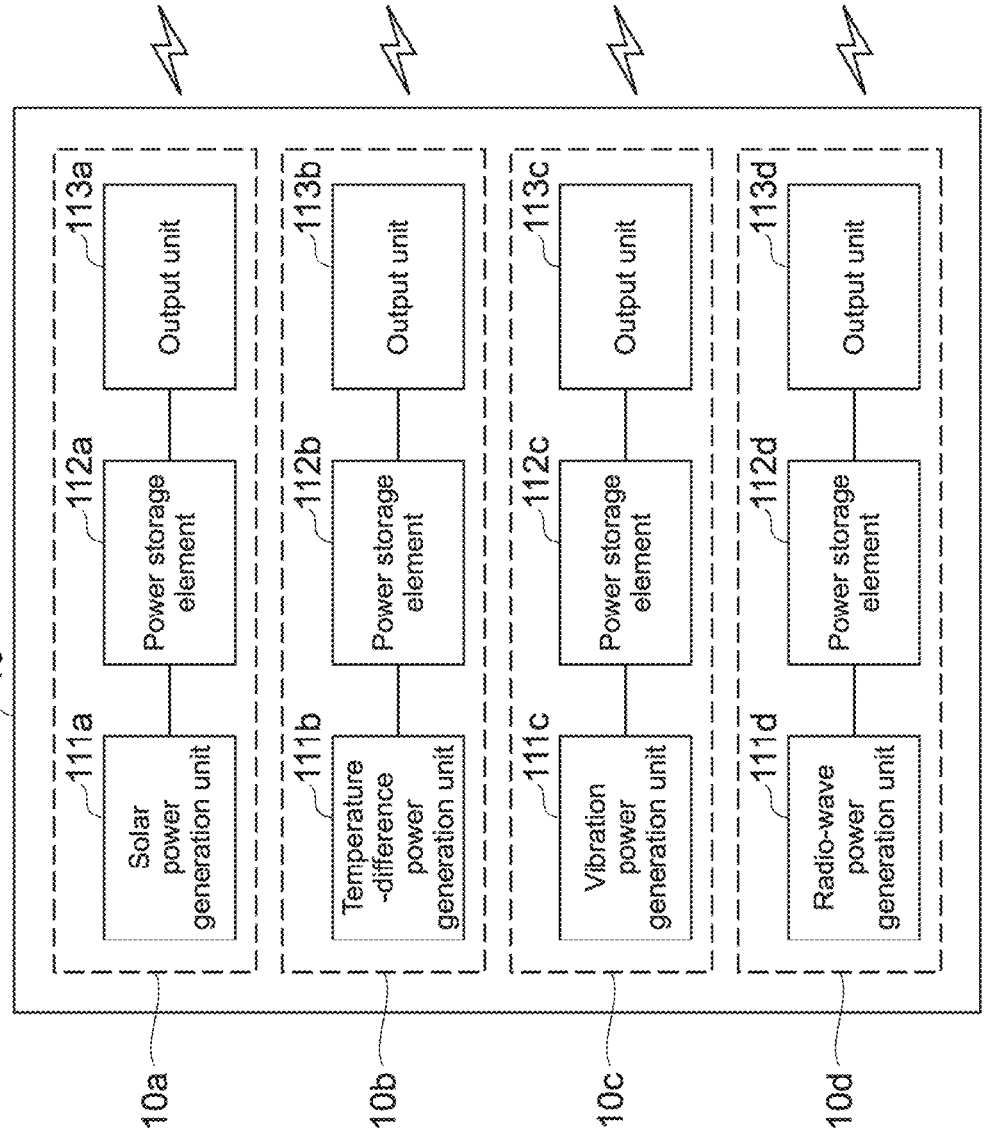
FIG. 18 A block diagram showing an example of the sensor device.

FIG. 18 is a block diagram showing an example of the sensor device 10 according to this embodiment. The sensor device 10 includes one or more modules, for example.

As shown in the figure, the sensor device 10 includes, for example, four modules (module 10*a*, module 10*b*, module 10*c*, and module 10*d*). Each of the modules includes, for example, the power generation unit 111, the power storage element 112, and the output unit 113 which have been described above.

As shown in FIG. 18, the module 10*a* includes a solar power generation unit 111*a* that performs power generation with radiated solar light as an example of the power generation unit. In addition, the module 10*a* includes a power storage element 112*a* to be connected to the solar power generation unit 111*a* and an output unit 113*a* to be connected to the power storage element 112*a*.

The module 10*b* includes a temperature-difference power generation unit 111*b* that performs power generation by utilizing a temperature difference as an example of the power generation unit. In addition, the module 10*b* includes a power storage element 112*b* to be connected to the temperature-difference power generation unit 111*b* and an output unit 113*b* to be connected to the power storage element 112*b*.

The module 10*c* includes a vibration power generation unit 111*c* that performs power generation in a manner that depends on vibration as an example of the power generation unit. In addition, the module 10*c* includes a power storage element 112*c* to be connected to the vibration power generation unit 111*c* and an output unit 113*c* to be connected to the power storage element 112*c*.

The module 10*d* includes a radio-wave power generation unit 111*d* that performs power generation by utilizing radio waves as an example of the power generation unit. In addition, the module 10*d* includes a power storage element 112*d* to be connected to the radio-wave power generation unit 111*d* and an output unit 113*d* to be connected to the power storage element 112*d*.

In this manner, in the sensor device 10, the output unit is provided corresponding to each power generation unit as an example.

Note that the sensor device 10 including the solar power generation unit 111*a*, the temperature-difference power generation unit 111b, the vibration power generation unit 111c, and the radio-wave power generation unit 111d has been described with reference to FIG. 18, but devices other than these may be mounted as the sensor. For example, as the sensors other than the power generation unit that drives the sensor device 10, one or a plurality of various sensors such as an acceleration sensor, a gyro sensor, a geomagnetic sensor, a temperature sensor, a humidity sensor, and a pulse sensor may be mounted on the sensor device 10.

Further, these sensors may be driven on the basis of power generated by the power generation units. The output unit 113 of the sensor device 10 may transmit information obtained from these sensors to the relay apparatus 20 or the management apparatus 30. Further, the management apparatus 30 may receive the information that these sensors of the sensor device 10 have output via the communication unit 31 and use them when carrying out the search target specification processing and the individual position capturing processing described above. Further, the management apparatus 30 may use the output information of these sensors or combine the output information of the sensors with the power generation information of the power generation units to carry out processing of estimating a state of a livestock animal, which is to be described later.

An example of a specific configuration of the module will be described taking the module 10a as an example.

Figure 19:
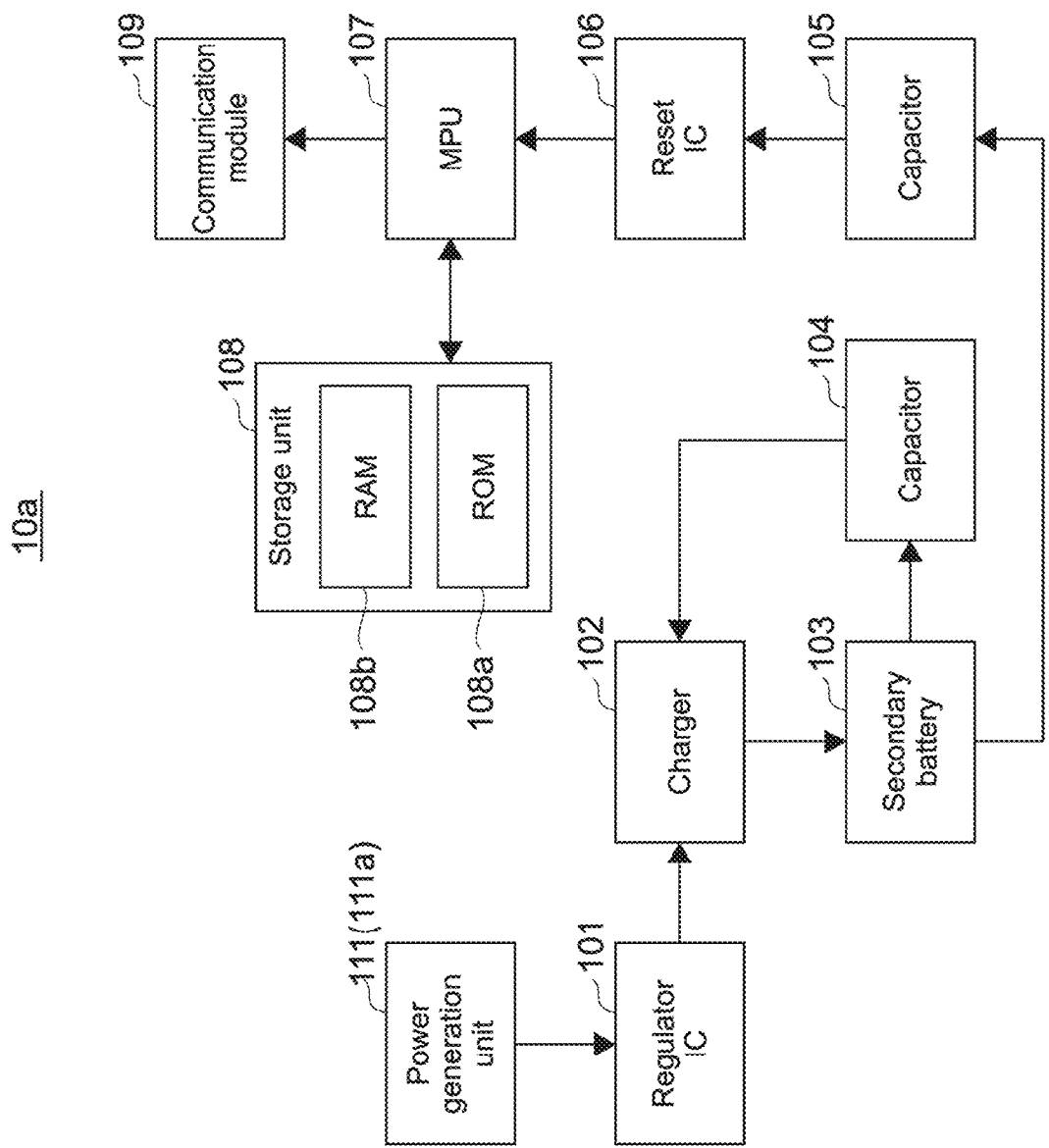
FIG. 19 A block diagram showing details of the sensor device shown in FIG. 18.

FIG. 19 is a diagram showing an example of a specific configuration of the module 10a.

The module 10a has a configuration including a power generation unit 111, a regulator IC 101, a charger 102, a secondary battery 103, a capacitor 104, a capacitor 105, a reset IC 106, an MPU 107, a storage unit 108, and a communication module 109, for example. The storage unit 108 has a configuration including a ROM (Read Only Memory) 108a and a RAM (Random Access Memory) 108b, for example.

As described above, the power generation unit 111 in the module 10a is the solar power generation unit 111a formed of a solar battery.

The regulator IC 101 is supplied with electric power generated by the power generation unit 111. The regulator IC 101 increases or decreases an input voltage so as to keep an output voltage constant. Whether the regulator IC 101 increases or decreases the voltage depends on the configuration of the power generation unit 111.

The output voltage of the regulator IC 101 is supplied to the charger 102.

The charger 102 is a circuit that charges the secondary battery 103 by utilizing electric power supplied from the regulator IC 101. Note that a configuration in which the charger 102 controls discharge of the secondary battery 103 may be employed. The charger 102 may monitor the presence/absence of an abnormality of the secondary battery 103. Under the charge control of the charger 102, the secondary battery 103 is charged.

The secondary battery 103 is a rechargeable battery. Examples of the secondary battery 103 can include a lithium-ion secondary battery. As a matter of course, other secondary batteries may also be employed. The capacity of the secondary battery 103 may be, for example, approximately several μWh (microwatt hour) or may be several mWh (milliwatt hour). Therefore, the secondary battery 103 does not increase in size. An output voltage of the secondary battery 103 is supplied to the capacitor 104 and the capacitor 105.

Due to the output voltage from the secondary battery 103, electric power is stored in the capacitor 104. The electric power stored in the capacitor 104 is used as a power supply of the charger 102. A power supply for actuating the charger 102 may be additionally provided.

Due to the output voltage from the secondary battery 103, electric power is stored in the capacitor 105. The capacitor 105 is provided for taking out a weak current, for example. Further, in a case of using the capacitor 105 and using the reset IC 106 as the output unit, the reset IC 106 and the like can perform operations depending on the voltage of the capacitor 105, and the configuration of the circuit can be simplified. Note that a configuration in which the secondary battery 103 is connected to the reset IC 106 without the capacitor 105 may be employed. The secondary battery 103, the capacitor 104, and the capacitor 105 correspond as an example of the above-mentioned power storage element 12.

The reset IC 106 is an example of the above-mentioned integrated circuit of the output unit 113. The reset IC 106 includes, for example, a comparator that compares a voltage of the capacitor 105 with a reference voltage, for example, and an element such as a transistor that is turned on/off in a manner that depends on an assessment result. The reference voltage is, for example, set to be equal to or higher than an operating voltage (e.g., 3.3 V or 5 V) of the MPU 107.

The reset IC 106 switches from the off-state to the on-state once the voltage of the capacitor 105 becomes equal to or higher than the reference voltage. The capacitor 105 and the MPU 107 are connected to each other correspondingly to switching of the reset IC 106 to the on-state. Then, electric power stored in the capacitor 105 is supplied as the operating voltage of the MPU 107.

The MPU 107 is connected to the reset IC 106 and the communication module 109. The MPU 107 operates with electric power, which is supplied corresponding to switching of the reset IC 106 to the on-state, as a power supply. The MPU 107 controls the communication module 109 and the like.

The storage unit 108 to be connected to the MPU 107 includes, for example, the ROM (Read Only Memory) 108a and the RAM (Random Access Memory) 108b. Programs to be executed by the MPU 107 are, for example, stored in the ROM 108a. Note that an identifier allocated to the module 10a in advance may be stored in the ROM 108a. The RAM 108b is used as a work memory or the like when the MPU 107 executes processing. For example, if the identifier of the module 10a is allocated when communication connection is established, the allocated identifier may be stored in the RAM 108b.

Under the control of the MPU 107, the communication module 109 performs processing based on a predetermined communication method and is an example of the above-mentioned communication module of the output unit 113. Although the illustration is omitted, the communication module 109 includes a small antenna such as a film antenna and a bar antenna or a capacitor sufficiently satisfying antenna's functions. As described above, a well-known method can be applied to the communication method performed by the communication module 109, and it is not limited to a particular communication method.

Note that a configuration in which the storage unit 108 is connected to the communication module 109 may be employed. A configuration in which a plurality of (e.g., two) storage units are connected to each of the MPU 107 and the communication module 109 is also possible.

Although the example of the configuration of the module 10a has been described above, configurations of the other modules may be appropriately changed in a manner that depends on the configuration and the like of the power generation unit. Further, for example, the configurations of the output unit of the module 10a and the output unit of the module 10b may differ. If a configuration different from the configuration described above is employed, for example, if the output of the power generation unit is an alternating current, a rectification circuit may be provided on an output side of the power generation unit.

Some configurations in the sensor device 10 may be made common among the respective modules. For example, a configuration in which MPUs of the respective modules can access the storage unit 108 may be employed. The storage area of the storage unit 108 may be divided into a plurality of sections, and storage areas dedicated to the respective modules may be allocated thereto. A configuration in which the respective modules use the respective storage areas in a time-division manner may be employed. Alternatively, a control method in which the respective modules sequentially use the allocated storage areas may be applied to the sensor device 10.

The sensor device 10 having such a configuration basically operates due to power generation by the power generation unit 111. Therefore, configurations of a battery, a battery for driving a circuit, and the like can be made unnecessary.

With this, the sensor device 10 according to this embodiment can save troubles of replacement, charge, and the like of the battery and reduce the costs of disposal and replacement due to dead of a battery or the like.

Further, the sensor device 10 can constantly perform monitoring and can be downsized by making the battery, the battery for driving the circuit, and the like unnecessary. Further, due to its small size, the sensor device 10 can reduce the risk of detachment and malfunction caused by collision or the like between livestock animals.

In addition, downsizing of the sensor device 10 can reduce the stress of the livestock animal during attachment. Furthermore, accidental ingestions can also be reduced.

[Operation Example of Sensor Device]

Figure 20:
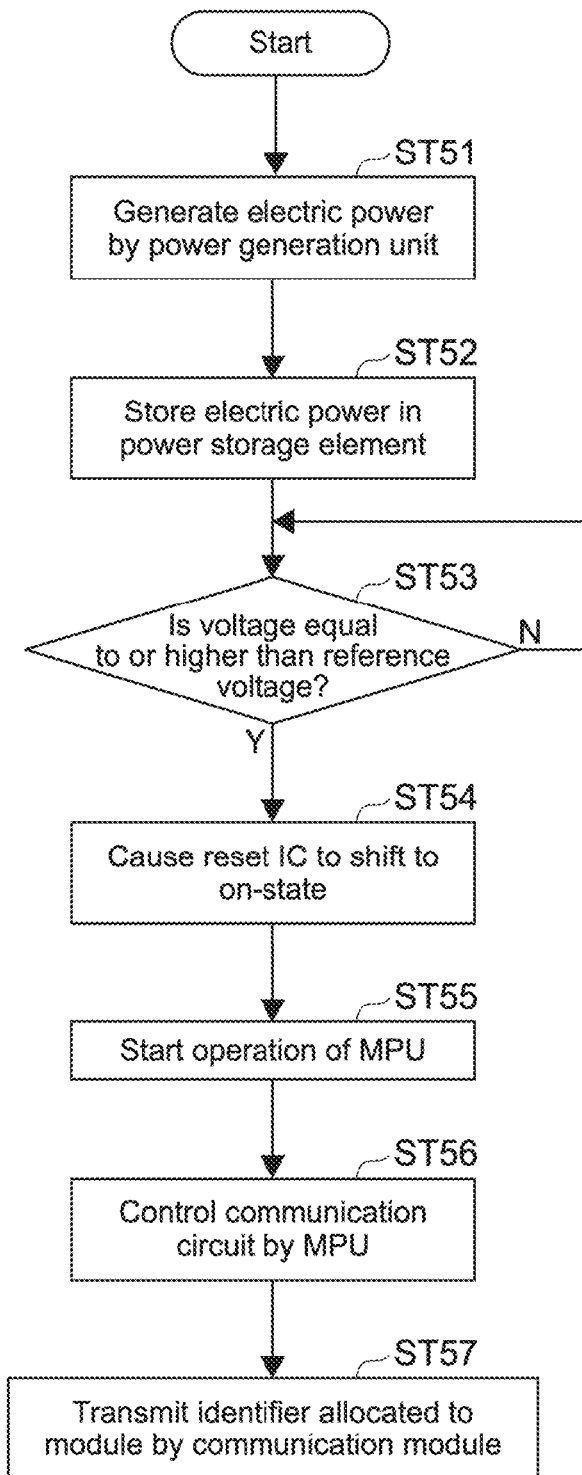
FIG. 20 A flowchart for explaining an example of a processing flow in the sensor device.

FIG. 20 is a flowchart describing an example of a flow of processing when the sensor device 10 transmits power generation information and the like. Here, an example of the flow of processing in the module 10a will be described. Although flows of processing of the other modules are substantially similar to that of the module 10a, there may be differences depending on the configurations of the modules. The processes of the respective modules are independently performed, for example.

In Step ST51, the power generation unit 111 (in this example, solar power generation unit 111a) performs power generation. For example, a livestock animal wearing the sensor device 10 goes outside in fine weather, the power generation unit 111 is irradiated with solar light, and thus the power generation unit 111 performs power generation. As a matter of course, in case of bad weather or cloudy weather, the power generation unit 111 does not perform power generation or generates little electric power. Then, the processing proceeds to Step ST52.

In Step ST52, electric power generated by the power generation unit 111 is supplied to the capacitor 105 that is one of the power storage elements via the regulator IC 101 or the like. Then, electric power is stored in the capacitor 105, and the voltage of the capacitor 105 increases. Then, the processing proceeds to Step ST53.

In Step ST53, it is determined whether or not the voltage of the capacitor 105 is equal to or higher than the reference voltage. If the voltage of the capacitor 105 is lower than the reference voltage, the processing returns to Step ST53. If the voltage of the capacitor 105 is equal to or higher than the reference voltage, the processing proceeds to Step ST54.

In Step ST54, correspondingly to the fact that the voltage of the capacitor 105 is equal to or higher than the reference voltage, the reset IC 106 switches from the off-state to the on-state. Note that, correspondingly to the fact that the voltage of the capacitor 105 is equal to or higher than the reference voltage, the state of the reset IC 106 switches and the determination processing in Step ST53 is not performed due to a certain functional block. Correspondingly to the fact that the reset IC 106 switches to the on-state, an output voltage of the capacitor 105 is supplied to the MPU 107. Then, the processing proceeds to Step ST55.

In Step ST55, the MPU 107 operates with electric power supplied from the capacitor 105 as the power supply. The MPU 107 reads out a program stored in the ROM 108a, for example, and executes processing depending on a code described in the program. Then, the processing proceeds to Step ST56.

In Step ST56, the MPU 107 supplies electric power to the communication module 109 and controls the communication module 109. That is, the MPU 107 instructs the communication module 109 to start communication and, for example, instructs the communication module 109 to transmit the identifier of the module 10a to the communication apparatus 2. Then, the processing proceeds to Step ST57.

In Step ST57, the communication module 109 performs communication under the control of the MPU 107. The communication module 109 transmits the identifier allocated to the module 10a, for example, to the relay apparatus 20 in accordance with a predetermined communication method.

In this embodiment, an output of the identifier by the sensor device 10 is associated with power generation of the power generation amount equal to or larger than the predetermined amount. Therefore, the output of the identifier can be considered as the output of the power generation information. Thus, the management apparatus 30 which has received the identifier of the module 10a is, for example, capable of recognizing that the solar power generation unit 11a of the module 10a has generated electric power equivalent to an energy amount for performing some of or all operations of the system.

That is, the management apparatus 30 is capable of generating information on a power generation amount and frequency of power generation of the power generation unit 111 on the basis of the number of times this identifier is received, and the like.

[Example of State Estimated on Basis of Power Generation Information]

Figure 21:
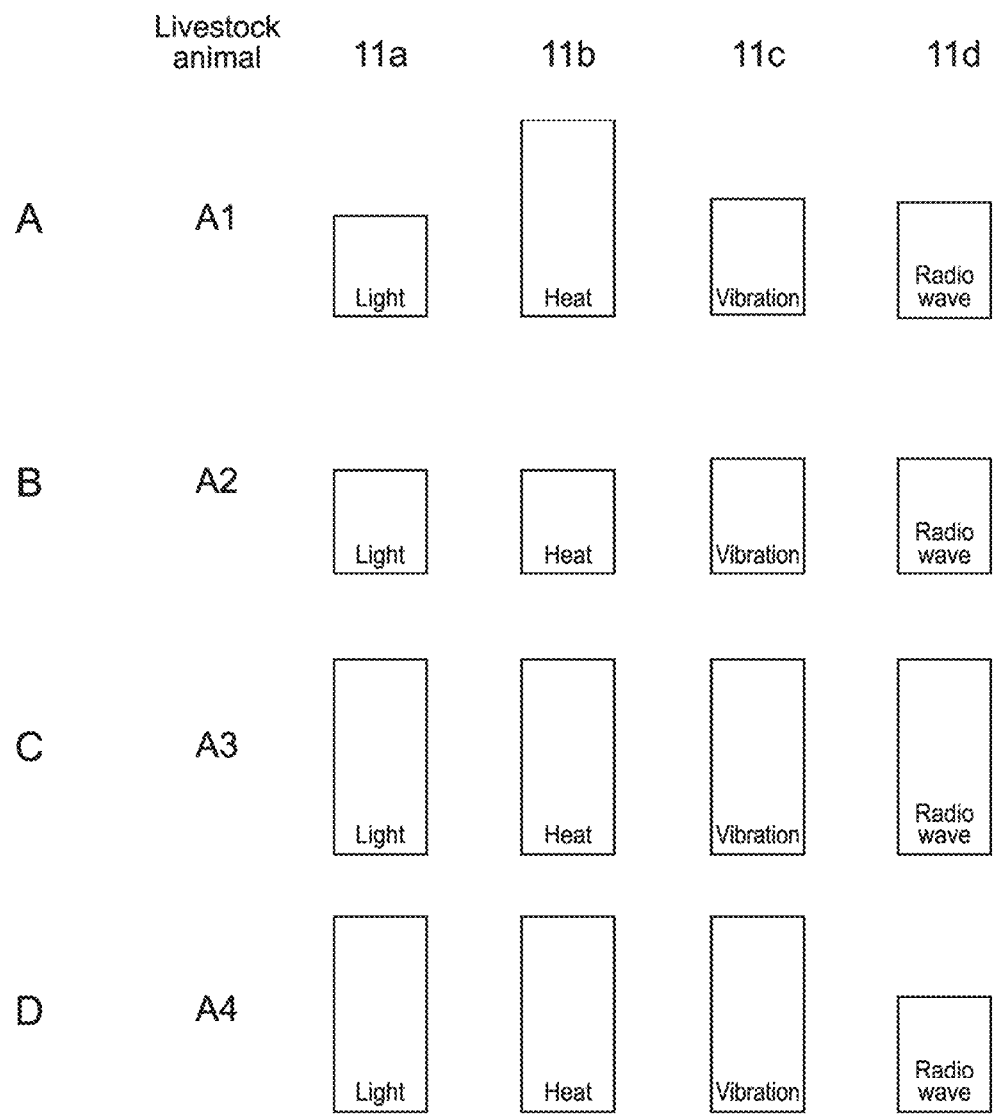
FIG. 21 Diagrams showing an example of individual information output from the sensor device.

Hereinafter, an example of the state of the livestock animal estimated from the power generation information received by the management apparatus 30 will be described with reference to FIG. 21.

FIG. 21A to FIG. 21D are diagrams showing outputs from sensor devices 10 respectively attached to different livestock animals A1, A2, A3, and A4. In the figure, the bar-like graph schematically show patterns of the number of times of reception of the identifiers of the respective modules. Further, "light" described in the graph indicates the number of times of reception of the identifier of the module including the solar power generation unit 111a, "heat" indicates the number of times of reception of the identifier of the module 10b including the temperature-difference power generation unit 111b, "vibration" indicates the number of times of reception of the identifier of the module 10c including the vibration power generation unit 111c, and "radio waves"

indicates the number of times of reception of the identifier of the module 10d including the radio-wave power generation unit 111d.

Note that, as described above, the power generation amount tends to increase as the number of times of reception of the identifier from each module becomes larger. Thus, in the following description, if the number of times of reception of the identifier from the module is large, the expression "the power generation amount of the power generation unit installed in that module is large" will be used, and if the number of times of reception is small, the expression "the power generation amount is small" will be used.

(Staying Place)

For example, the CPU of the management apparatus 30 is capable of estimating a staying place of a livestock animal on the basis of the power generation information of the solar power generation unit 111a.

Comparing power generation amounts of the solar power generation units 111a in FIGS. 21A and 21B with power generation amounts of the solar power generation units 111a in FIGS. 21C and 21D, the power generation amounts of the solar power generation units 111a in the latter case are larger. With this, it can be estimated that the livestock animals A3 and A4 have stayed in an outdoor pasture longer than the livestock animals A1 and A2.

Further, a further detailed staying place of a livestock animal can be estimated by using the power generation amount from the radio-wave power generation unit 111d.

For example, comparing a power generation amount from the radio-wave power generation unit 111d in FIG. 21C with a power generation amount from the radio-wave power generation unit 111d in FIG. 21D, it can be estimated that the livestock animal A3 have stayed in a place having more radio waves in comparison with the livestock animal A4. Therefore, if distribution of places having strong radio field intensity and places having weak radio field intensity is formed within the pasture, it becomes possible to also estimate the staying place of the livestock animal in the pasture on the basis of the power generation amount from the radio-wave power generation unit 111d.

(Activity Amount)

For example, the CPU of the management apparatus 30 is capable of estimating an activity amount of the livestock animal on the basis of the power generation information of the vibration power generation unit 111c.

Comparing power generation amounts of the vibration power generation units 111c in FIGS. 21A and 21B with power generation amounts of the vibration power generation units 11c in FIGS. 21C and 21D, the power generation amounts of the vibration power generation units 111c in the latter case are larger. With this, it can be estimated that the activity amount of the livestock animals A3 and A4 is larger than that of the livestock animals A1 and A2.

Further, duration of an outdoor staying time can be estimated by using the power generation amount from the solar power generation unit 111a. Typically, it can be considered that livestock animals, which have stayed longer outdoor, actively behave. Therefore, an activity amount of a livestock animal can be indirectly estimated also on the basis of the power generation amount from the solar power generation unit 111a.

In addition, by analyzing the power generation information of the vibration power generation unit 111c for a predetermined period, the states of the livestock animals can also be estimated from variations in the power generation amount. For example, if the power generation amount of the vibration power generation unit 111c is high in average, it can be estimated that it is an individual whose activity amount is large as a whole. On the other hand, if the power generation amount of the vibration power generation unit 111c largely varies, it can be estimated that it is an individual that has received an impact or have some troubles.

(Behavior of Livestock Animal)

In addition, the management apparatus 30 is, for example, capable of analyzing a pattern of frequency of power generation and estimating behavior of a livestock animal on the basis of the power generation information of the vibration power generation unit 111c.

For example, regarding a move of an ear and a move of a limb to which the sensor devices 1 are attached, they are different in vibration frequency. Therefore, they are also different in power generation pattern. Thus, their behavior can be identified. Further, if a characteristic power generation pattern can also be found in walking, running, mounting, or the like of livestock animals, their behavior can be estimated.

(Presence/Absence of Fever)

For example, the management apparatus 30 is capable of estimating the presence/absence of fever of the livestock animal on the basis of the power generation information of the temperature-difference power generation unit 111b and the solar power generation unit 111a.

Comparing a power generation amount of the temperature-difference power generation unit 111b in FIG. 21A with a power generation amount of the temperature-difference power generation unit 111b in FIG. 21B, the power generation amount of the temperature-difference power generation unit 111b in the former is larger. On the other hand, the power generation amounts of these solar power generation units 111a are substantially the same.

With this, it can be estimated that despite the fact that both of the livestock animals A1 and A2 have stayed indoor for substantially the same time, the livestock animal A1 has a higher body temperature than the livestock animal A2.

Further, by comparing the power generation amounts of the solar power generation units 111a and the temperature-difference power generation units 111b in FIG. 21B with the power generation amounts of the solar power generation units 111a and the temperature-difference power generation units 111b in FIG. 21C, both the power generation amounts of FIG. 21C are larger.

With this, it can be estimated that, regarding the livestock animal A3, the power generation amount of the temperature-difference power generation unit 111b has increased due to its long stay in a lower-temperature place (e.g., outdoor such as grazing land) in comparison with the livestock animal A2. Therefore, it can be estimated that, regarding the livestock animal A3, the power generation amount of the temperature-difference power generation unit 111b is large but it is unlikely that it has a fever.

In addition, examples of a cause of fever of a livestock animal can include disease, stress, estrus, and the like. Therefore, such a factor that can be a cause of fever can also be estimated by estimating the presence/absence of fever.

(Estrus)

The management apparatus 30 is, for example, capable of estimating whether or not a livestock animal is in estrus on the basis of the power generation information.

During estrus, the activity amount and body temperature of the livestock animal generally increase. With this, the management apparatus 30 is capable of estimating whether or not a livestock animal is in estrus on the basis of the power generation information from the vibration power generation unit 111c, the temperature-difference power generation unit 111b, and the like as described above.

(Meat Quality)

For example, the management apparatus 30 is capable of estimating meat quality on the basis of the power generation information.

It is considered that the meat quality of livestock animals generally depends on feed, exercise load, stress, and the like. As described above, the exercise load (activity amount) and stress can be estimated on the basis of the power generation information. Further, regarding the feed, as long as staying places of individual livestock animals can be grasped on the basis of the power generation information from the radio-wave power generation unit 11d and the solar power generation unit 11a, the kinds of grasses and the like eaten by these livestock animals can also be specified.

Thus, it becomes possible for the management apparatus 30 to estimate the meat quality of individual livestock animals that can usually be checked after they are processed as meat.

In this way, the management apparatus 30 can estimate various conditions of the livestock animal on the basis of the power generation information. Therefore, since the health condition and activity state of the livestock animal are indirectly detected from these electric power generation states, by providing a reference value for the individual power generation amounts or providing a reference value for a combination of a plurality of arbitrary power generation amounts, it becomes possible to set one or a plurality of conditions for extracting a specific livestock animal.

According to this embodiment, in cases where there are a fairly large number of pastured livestock animals, a pasture area is extremely extensive, and the like, it is possible to not only specify an individual on which individual care needs to be performed, such as an individual that has become ill or is in estrus, but also readily capture a position or movement destination of that individual.

Second Embodiment

Subsequently, a second embodiment of the present technology will be described.

Hereinafter, configurations different from those of the first embodiment will mainly be described, configurations similar to those of the embodiment above will be denoted by similar symbols, and descriptions thereof will be omitted or simplified.

The first embodiment above is configured such that pieces of biological information transmitted from the respective livestock animals A are received by the plurality of relay apparatuses 20, individual information obtained by adding communication state information to these pieces of biological information is transmitted from the respective relay apparatuses 20 to the management apparatus 30, and the management server 301 performs extraction and position capturing of a specific livestock animal A.

In this embodiment, the sensor device worn by each livestock animal is configured to be capable of not only transmitting biological information of the livestock animal but also receiving transmission information from sensor devices worn by the plurality of other livestock animals in the periphery and transmitting these to the management apparatus 30 or the mobile object 40. In other words, this embodiment differs from the first embodiment in that the individual sensor devices also include a function as a relay apparatus.

Figure 22:
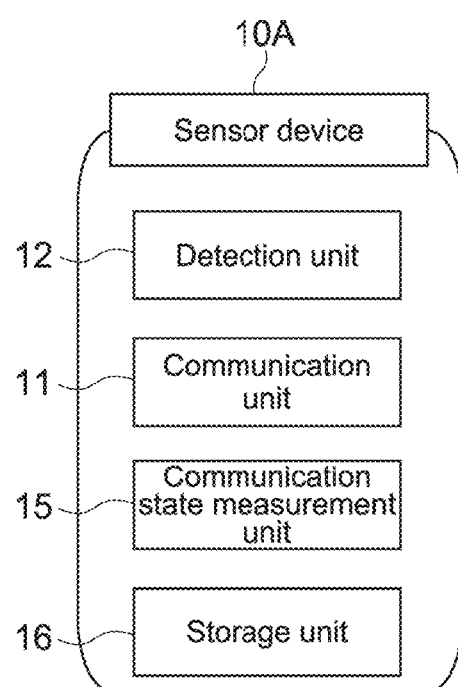
FIG. 22 A functional block diagram showing a configuration of a sensor device used in another embodiment of the present technology.

FIG. 22 is a functional block diagram showing a configuration of a sensor device 10A according to this embodiment. In this embodiment, the sensor device 10A includes the communication unit 11, the detection unit 12, a communication state measurement unit 15, and a storage unit 16.

The communication unit 11 and the detection unit 12 are similar to those of the first embodiment, so descriptions thereof will be omitted. In this embodiment, the communication unit 11 is further configured to be capable of receiving, from a plurality of other livestock animals A (sensor devices 10A) in the periphery, biological information (first information) of those livestock animals. The communication state measurement unit 15 is configured by a calculation apparatus such as a computer including a CPU, a memory, and the like. The storage unit 16 is typically configured by a semiconductor memory or the like.

The communication state measurement unit 15 generates information related to the communication states among the sensor devices 10A (communication units 11) (second information). The communication state measurement unit 15 detects or measures a transmission signal level of a counterpart (signal transmission side), a reception intensity of itself, and the like as the communication states among the sensor devices 10A. The communication unit 11 is further configured to be capable of transmitting individual information of each livestock animal A including the biological information (first information) transmitted from each of the sensor devices 10 and the communication state information (second information) related to the communication state, that has been generated by the communication state measurement unit 15, to the management apparatus 30 or the mobile object 40.

The storage unit 16 is configured to store the biological information of other livestock animals received by the communication unit 11, the biological information of itself (relevant livestock animal) detected by the detection unit 12, the communication state information generated by the communication state measurement unit 15, and the like.

The individual information to be transmitted from each of the sensor devices 10A to the management apparatus 30 or the mobile object 40 is configured as a dataset including the biological information (first information), the communication state information (second information), identification information (UID) of the sensor device 10A, and the like. The communication state information (second information) includes transmission signal levels from other sensor devices 10A, a reception signal intensity, reception time, and reception hour of information transmitted from the other sensor devices 10A, and the like.

The communication form between the respective sensor devices 10A and the management apparatus 30 or the mobile object 40 is not limited in particular, and the various communication methods described above are applicable. The transmission timings and transmission intervals of the individual information from the respective sensor devices 10A to the management apparatus 30 are also not limited in particular and only need to be set at appropriate timings and intervals. For example, the mobile object 40 may periodically receive data from each individual and transmit it to the management apparatus 30.

The mobile object 40 may be configured to search for a specific livestock animal while receiving data from individual livestock animals. In this case, position information acquired by the mobile object 40 may be transmitted to the management apparatus (management server 301), and a calculation result of the position capturing unit 33 (FIG. 2) may be received by the mobile object 40. In this case, the mobile object 40 also includes a function as a relay apparatus. Alternatively, it is also possible for the mobile object 40 to include a configuration similar to that of the position capturing unit 33 so that the mobile object 40 can autonomously search for a specific livestock animal.

Figure 23:
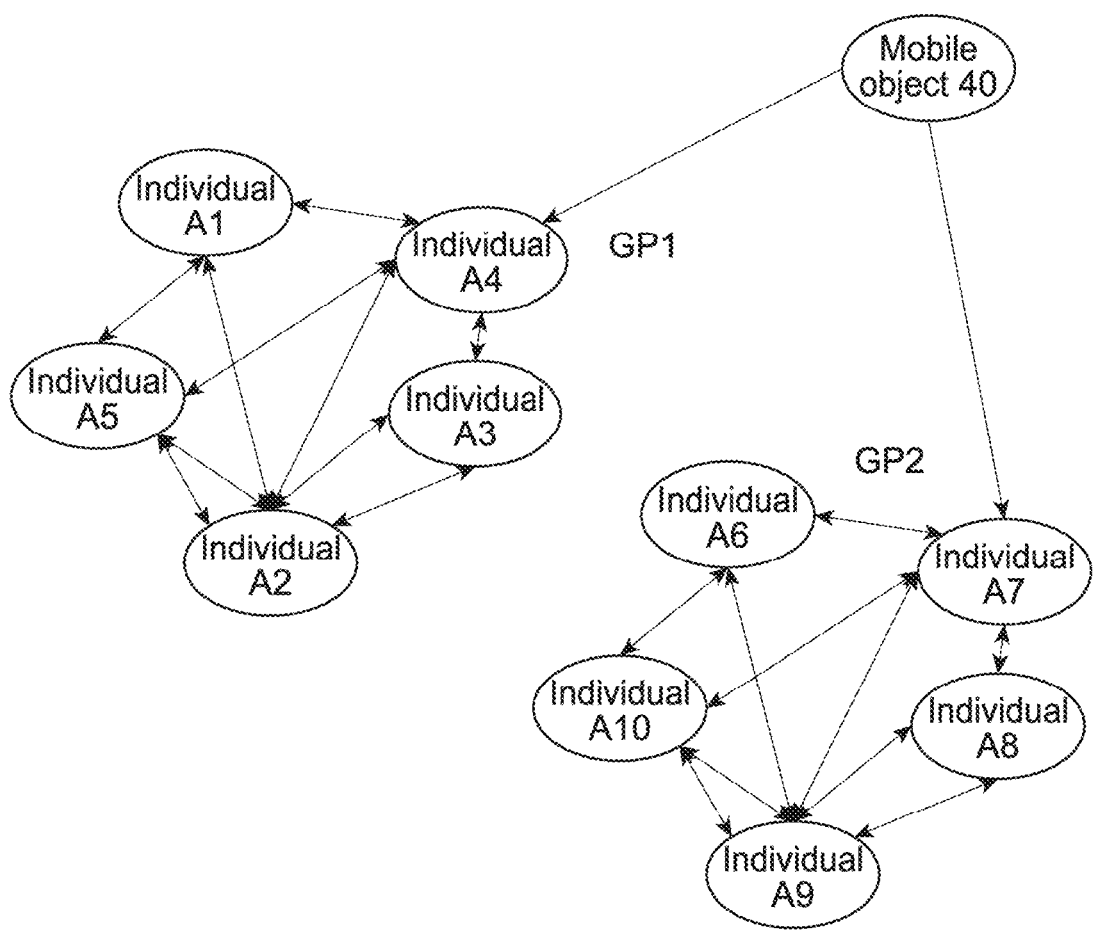
FIG. 23 A schematic diagram for explaining an individual search system when the mobile object is used as the relay apparatus.

FIG. 23 is a schematic diagram for explaining the individual search system at a time the mobile object 40 is used as the relay apparatus.

As shown in FIG. 23, a case where a plurality of individuals A1 to A10 (livestock animals) are divided and gathered into two groups GP1 and GP2 will be discussed. In this case, the 5 individuals A1 to A5 belonging to the group GP1 exchange individual information with one another so that each of them shares other pieces of individual information. Similarly, each of the other 5 individuals A6 to A10 belonging to the group GP2 shares other pieces of individual information.

In such a state, the mobile object 40 is capable of acquiring, by communicating with one arbitrary individual belonging to either group, position information of other individuals within the same group. Therefore, it becomes possible to search for a position of a specific individual on the basis of the position information received from the plurality of individuals. Moreover, also in a case where the position of the specific livestock animal A changes with time (i.e., case where that specific livestock animal moves), it becomes possible to search for a movement destination or movement trajectory of that specific livestock animal. Hereinafter, that search procedure will be described.

Figure 24:
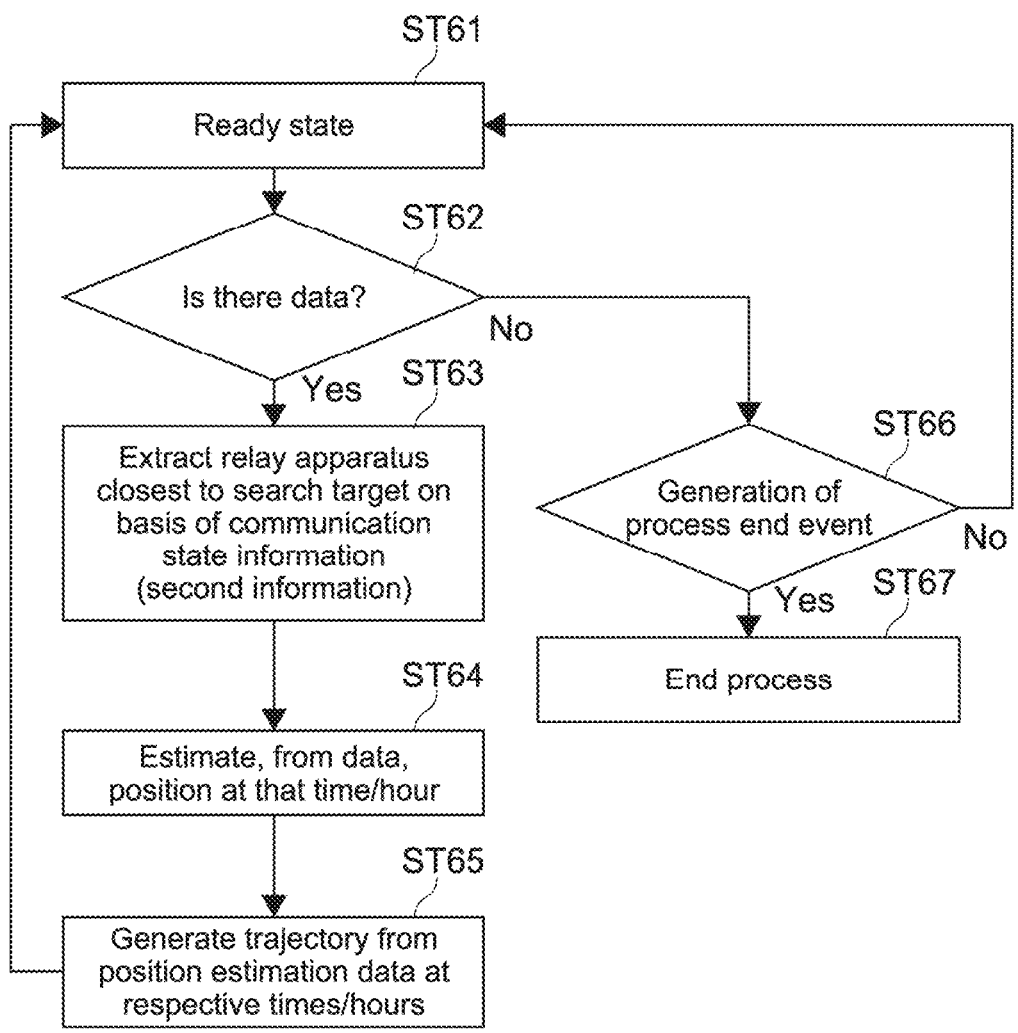
FIG. 24 A flowchart showing an individual search procedure in the another embodiment.

FIG. 24 is a flowchart showing the search procedure of a specific livestock animal in the management apparatus 30 (management server 301) of this embodiment. It should be noted that the processing may also be executed in the mobile object 40.

In a ready state, the management server 301 judges whether there is reception data (individual information) from the sensor devices 10A worn by the respective livestock animals or the mobile object 40 as the relay apparatus (ST61, 62). Whether there is reception data is judged on the basis of reception information stored in the storage unit 34 (FIG. 2), for example.

Upon receiving the individual information of each livestock animal, the management server 301 (position capturing unit 33) specifies, out of the plurality of sensor devices 10A that have received data on a position capturing target (specific livestock animal A as search target) at the same time or hour, the sensor device 10A closest to the specific livestock animal A (ST63). Here, of the plurality of sensor devices 10A, a sensor device 10A that has a lowest transmission signal level regarding the search target and has been capable of receiving that signal is extracted. As long as the signal can be received while maintaining the reception intensity even if the transmission signal level is low as described above, a distance between that sensor device 10A and the position capturing target is short, so the sensor device 10A closest to the specific livestock animal A is specified by the processing above.

Subsequently, on the basis of the reception data from the sensor device 10A closest to the specific livestock animal A, the management server 301 (position capturing unit 33) estimates the position of the specific livestock animal at a reception time of that data and generates position information related to that position (ST64). The generated position information is stored in the storage unit 34.

Next, the management server 301 (position capturing unit 33) references the position information related to the specific livestock animal, that has been generated last time, and additionally generates trajectory information related to a positional change of that livestock animal A (ST65). The generated trajectory information is stored in the storage unit 34.

The processing above is repetitively executed until a search process end event is generated (ST66, 67).

Specific examples of the processing above are shown in FIGS. 25 to 30. In each of the figures, a specific livestock animal A0 as a search target is indicated by a black inverted triangle.

Figure 25:
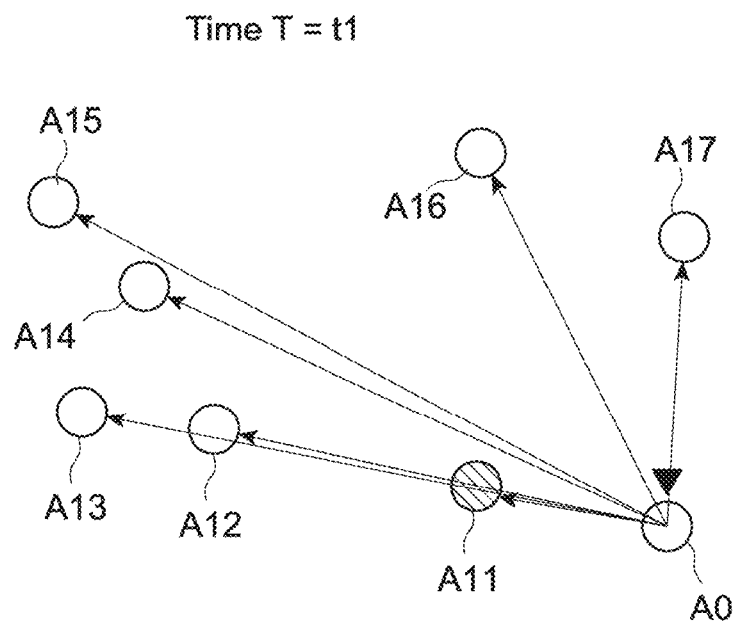
FIG. 25 A schematic diagram for explaining the individual search procedure in the another embodiment.
Figure 26:
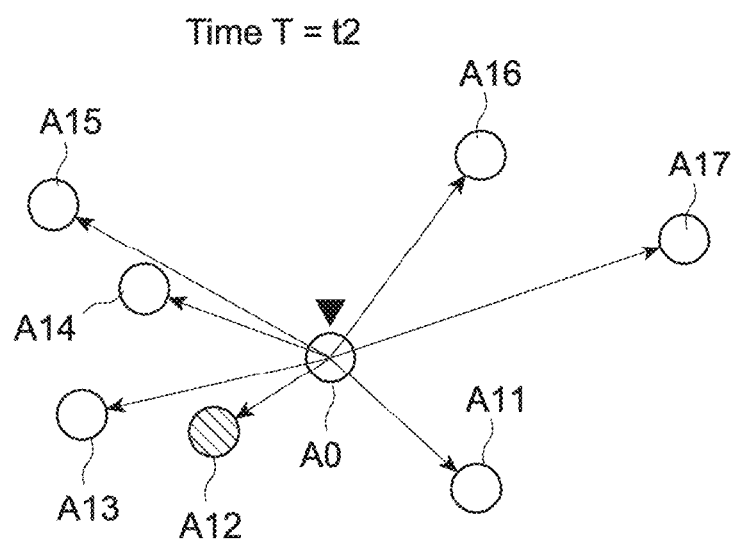
FIG. 26 A schematic diagram for explaining the individual search procedure in the another embodiment.
Figure 27:
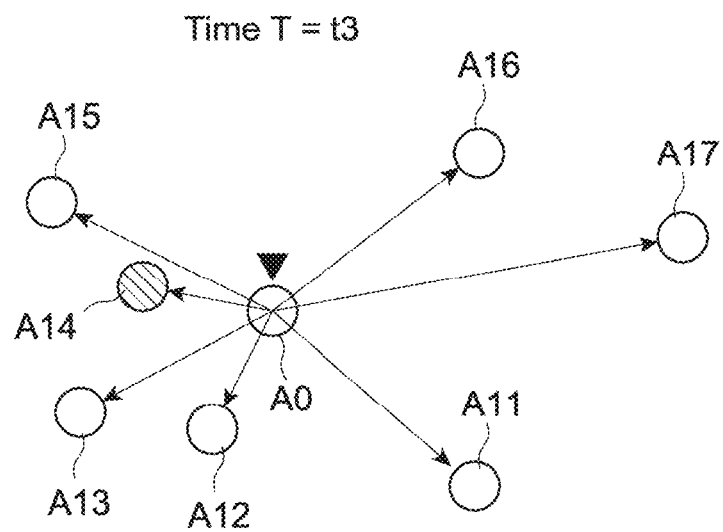
FIG. 27 A schematic diagram for explaining the individual search procedure in the another embodiment.
Figure 28:
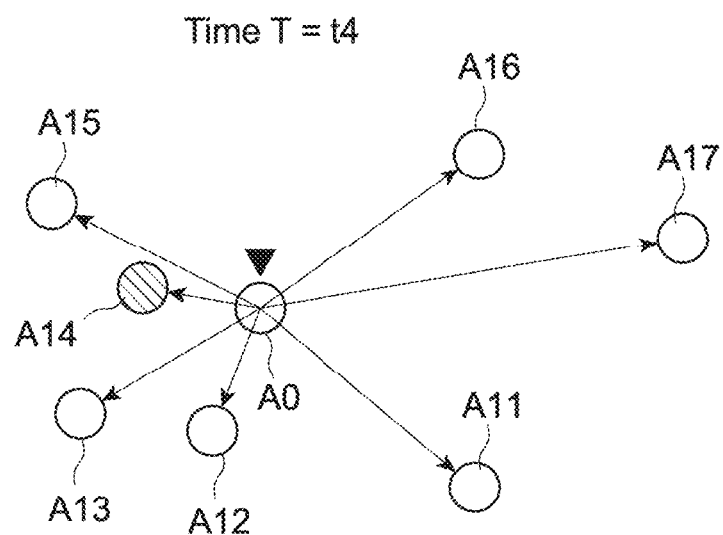
FIG. 28 A schematic diagram for explaining the individual search procedure in the another embodiment.
Figure 29:
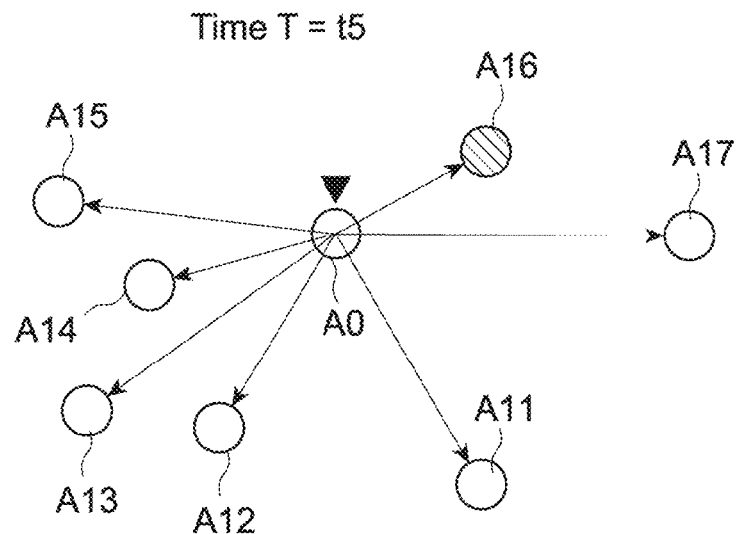
FIG. 29 A schematic diagram for explaining the individual search procedure in the another embodiment.
Figure 30:
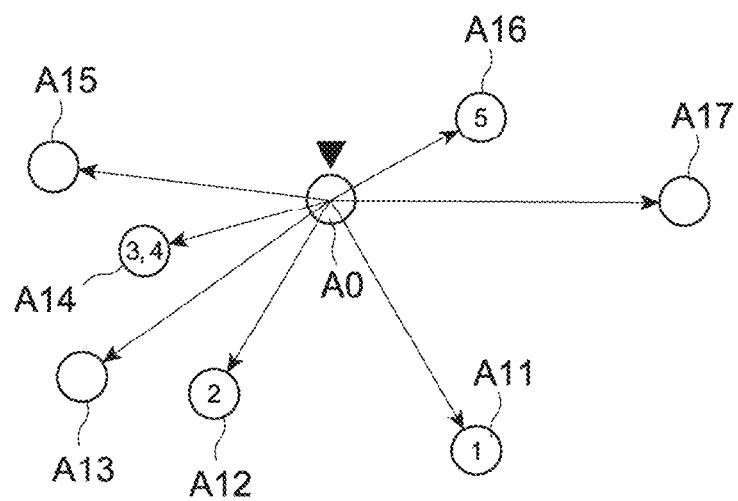
FIG. 30 A schematic diagram for explaining the individual search procedure in the another embodiment.

At a reception time (T) t1, a livestock animal that has a lowest transmission signal level (highest reception intensity) out of livestock animals A11 to A17 that receive individual information transmitted from the livestock animal A0 is the livestock animal A11 closest to the livestock animal A0 as shown in FIG. 25. After that, at times t2, t3, t4, and t5, the livestock animal closest to the livestock animal A0 sequentially changes in the order of the livestock animal A12, A13, A13, and A16 as shown in FIGS. 26 to 29. This is shown in FIG. 30 in time series. The management apparatus 30 (management server 301) references the time-series data and generates movement trajectory information of the livestock animal A0 as indicated by the arrow in broken lines in FIG. 31.

Figure 31:
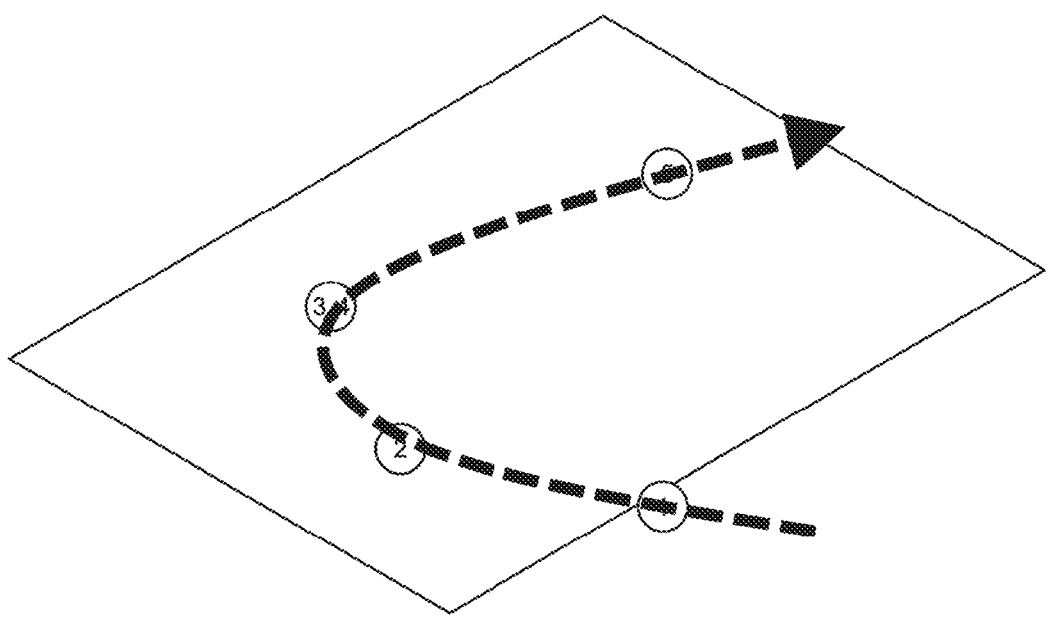
FIG. 31 A schematic diagram for explaining the individual search procedure in the another embodiment.

For example, the management server 301 transmits the time-series data or the trajectory information to the terminal apparatuses 302 and 303 so that the trajectory as shown in FIG. 31 is displayed on the display of the terminal apparatuses 302 and 303 on the basis of the time-series data or the trajectory information. The trajectory is displayed while being updated successively, and the movement of the mobile object 40 is provided in a visually easy-to-see manner.

As described above, according to this embodiment, since a time change of a position of a specific individual as a search target can be acquired, a behavioral state can be monitored. Moreover, since one or a plurality of individuals other than the search target can be monitored at the same time, the present technology can also be used in various biological surveys on group behavior characteristics of these individuals, and the like. Further, by grasping these individual behaviors before generation of a search event, individuals can be readily captured at the time a search event is generated.

Heretofore, the embodiments of the present technology have been described, but the present technology is not limited to the embodiments above and can of course be variously modified.

For example, it is of course possible to combine the first embodiment and the second embodiment. In this case, for example, the trajectory display of a specific individual, that has been described in the second embodiment, can also be applied to the first embodiment.

Further, although the livestock management system related to management or search of livestock animals has been taken as an example in the embodiments above, the present technology is not limited thereto. For example, the present technology is also applicable to production management, logistics management, and the like of industrial products and agricultural products. Furthermore, the present technology is also applicable to safety confirmation and search of those who become lost, search of lost children and pets, and the like.

It should be noted that the present technology can also take the following configurations.

(1) A management apparatus, including
a control unit that extracts, on the basis of first information that is generated by a sensor device worn by an individual and is related to a living body of the individual, a specific individual satisfying a predetermined condition, and generates, on the basis of position information related to a position of the specific individual, search information for causing a mobile object to move to the position of the specific individual.

(2) The management apparatus according to (1), in which
the control unit generates the position information on the basis of second information related to a communication state between the sensor device worn by the specific individual and a relay apparatus that receives the first information transmitted from the sensor device.

(3) The management apparatus according to (2), in which
the control unit includes
an individual extraction unit configured to extract the specific individual on the basis of the first information, and
a position capturing unit configured to generate the position information of the specific individual on the basis of the second information.

(4) An individual management system, including:
a plurality of sensor devices each including a detection unit that detects first information related to a living body of an individual and a first communication unit capable of transmitting the first information, the plurality of sensor devices being respectively worn by a plurality of individuals to be managed; and
a management apparatus including a control unit that extracts, on the basis of the first information, a specific individual satisfying a predetermined condition, and generates, on the basis of position information related to a position of the specific individual, search information for causing a mobile object to move to the position of the specific individual.

(5) The individual management system according to (4), further including
at least one relay apparatus including a second communication unit capable of receiving the first information transmitted from each of the plurality of sensor devices and transmitting individual information of each individual including second information related to a communication state with respect to the plurality of sensor devices and the first information,
in which the control unit generates the position information related to the position of the specific individual on the basis of the second information.

(6) The individual management system according to (5), in which
the relay apparatus includes a plurality of relay apparatuses, and
the control unit is configured to extract a relay apparatus closest to the specific individual out of the plurality of relay apparatuses on the basis of the second information, and generate the position information of the specific individual on the basis of the individual information transmitted from the relay apparatus closest to the specific individual.

(7) The individual management system according to any one of (4) to (6), further including
an information processing apparatus including a display unit that displays the position of the specific individual on the basis of the position information generated by the management apparatus.

(8) The individual management system according to any one of (4) to (7), in which
the detection unit includes at least one power generation element capable of generating electric power in accordance with a peripheral environment, and
the first communication unit is configured to transmit information related to a power generation amount of the power generation element using electric power supplied from the power generation element.

(9) The individual management system according to any one of (4) to (8), in which
the relay apparatus is at least one sensor device selected from the plurality of sensor devices.

(10) An individual search system, including:
a plurality of sensor devices each including a detection unit that detects first information related to a living body of an individual and a first communication unit capable of transmitting the first information, the plurality of sensor devices being respectively worn by a plurality of individuals to be managed;
at least one relay apparatus including a second communication unit capable of receiving the first information transmitted from each of the plurality of sensor devices and transmitting individual information of each individual including second information related to a communication state with the first communication unit and the first information;
a mobile object; and
a management apparatus including a control unit that receives the individual information of each individual transmitted from the relay apparatus, extracts a specific individual satisfying a predetermined condition on the basis of the first information, generates position information related to a position of the specific individual on the basis of the second information, and generates search information for moving the mobile object to the position of the specific individual on the basis of the position information.

(11) The individual search system according to (10), in which
the mobile object is an unmanned flying object configured to be capable of flying autonomously.

(12) The individual management system according to (10), in which
the mobile object is an unmanned traveling object configured to be capable of traveling autonomously.

(13) The individual search system according to any one of (10) to (12), in which
the management apparatus further includes a third communication unit capable of transmitting the search information to the mobile object and receiving mobile object information including information related to a position of the mobile object, and
the individual search system further includes
an information processing apparatus including a display unit that displays the mobile object information.

(14) The individual search system according to (13), in which
the mobile object includes an image pickup apparatus and a fourth communication unit capable of transmitting an output image of the image pickup apparatus to the management apparatus as the mobile object information.

(15) The individual search system according to any one of (10) to (14), in which
the relay apparatus includes a plurality of relay apparatuses, and
the mobile object is configured as a part of the plurality of relay apparatuses.

(16) The individual search system according to any one of (10) to (15), in which
the mobile object includes a display apparatus that externally displays the position of the specific individual.
(17) The individual search system according to any one of (10) to (16), in which
the control unit further generates a guidance instruction for guiding the specific individual to a predetermined location, and
the mobile object includes a guidance tool that is used to guide the specific individual to the predetermined location on the basis of the guidance instruction.

REFERENCE SIGNS LIST 1 system
10, 10A sensor device
20 relay apparatus
22 communication state measurement unit
30 management apparatus
32 individual extraction unit
33 position capturing unit
35 control unit
40, 40A, 40B mobile object
301 management server
302, 303 terminal apparatus
A livestock animal

The invention claimed is:

1. A management method comprising:
receiving first information related to a state of a worn sensor transmitted from the worn sensor,
extracting, on the basis of the first information related to the state of the worn sensor, a specific position of the worn sensor satisfying a predetermined condition, and
transmitting, search information to a mobile object having a motor for moving the mobile object, the search information for causing the mobile object to move to the position of the specific position of the worn sensor.

2. The management method according to claim 1, further comprising providing a User Interface (UI) to instruct a search of the worn sensor by the mobile object and receiving a search start instruction based on the user interface.

3. The management method according to claim 2, further comprising displaying, via the UI, on the basis of the position information of the worn sensor, the specific position of the worn sensor on a map image.

4. The management method according to claim 1, wherein the first information includes the position information of a specific living individual.

5. The management method according to claim 1, wherein the first information includes state information indicative of the state of the specific living individual.

6. The management method according to claim 1, further comprising receiving, from the mobile object, position information of the mobile object indicative of a position where the mobile object found the worn sensor on the basis of the first information after the transmission of the first information.

7. The management method according to claim 6, further comprising receiving, from the mobile object, image data of a specific living individual which the mobile object found on the basis of the search information after the transmission of the first information.

8. The management method according to claim 1,
wherein the mobile object is a traveling object configured to be capable of traveling autonomously using a wheel.

9. The management method to claim 1, wherein
the mobile object is an unmanned flying object configured to be capable of flying autonomously by using a propeller.

10. A mobile object, comprising:
a motor for moving the mobile object, the mobile object receives search information for causing the mobile object to move to a position of a worn sensor,
wherein the position of the worn sensor is extracted on the basis of first information related to a state of the worn sensor, detected and transmitted from the worn sensor and satisfying a predetermined condition after receiving a search start instruction based on a User Interface (UI) provided by a management apparatus.

11. The mobile object according to claim 10, wherein the UI is configured to display, on the basis of the position information of the specific worn sensor, the position of the worn sensor on a map image.

12. The mobile object according to claim 10, wherein the first information includes the position information of a specific living individual.

13. The mobile object according to claim 10, wherein the first information includes state information indicative of the state of the specific living individual.

14. The mobile object according to claim 10, wherein the management apparatus is further configured to receive, from the mobile object, position information of the mobile object indicative of a position where the mobile object found the worn sensor on the basis of the first information after the transmission of the first information.

15. The mobile object according to claim 14, wherein the management apparatus is further configured to receive, from the mobile object, image data of a specific living individual which the mobile object found on the basis of the search information after the transmission of the first information.

16. The mobile object according to claim 10,
wherein the mobile object is a traveling object configured to be capable of traveling autonomously using a wheel.

17. The mobile object to claim 10, wherein
the mobile object is an unmanned flying object configured to be capable of flying autonomously by using a propeller.

18. A management apparatus, comprising:
apparatus that receives first information related to a state of a worn sensor,
provides a User Interface (UI) to instruct a search for the worn sensor by a mobile object,
receives a search start instruction based on the user interface,
extracts, on the basis of the first information related to the state of the sensor, a position of the worn sensor satisfying a predetermined condition, and
transmits search information to a mobile object having a motor for moving the mobile object, the search information for causing the mobile object to move to the position of the worn sensor.

19. The management apparatus according to claim 18, wherein the UI is configured to display, on the basis of the position information of the worn sensor, the position of the worn sensor on a map image.

20. The management apparatus according to claim 18, wherein the first information includes the position information of a specific living individual.

21. The management apparatus according to claim 18, wherein the first information includes state information indicative of the state of the specific living individual.

22. The management apparatus according to claim 18, wherein the management apparatus is further configured to receive, from the mobile object, position information of the mobile object indicative of a position where the mobile object found the worn sensor on the basis of the first information after the transmission of the first information.

23. The management apparatus according to claim 22, wherein the management apparatus is further configured to receive, from the mobile object, image data of a specific living individual which the mobile object found on the basis of the search information after the transmission of the first information.

24. The management apparatus according to claim 18,
wherein the mobile object is a traveling object configured to be capable of traveling autonomously using a wheel.

25. The management apparatus according to claim 18, wherein
the mobile object is an unmanned flying object configured to be capable of flying autonomously by using a propeller.

* * * * *